United States Patent
Rush et al.

(10) Patent No.: US 11,042,341 B2
(45) Date of Patent: Jun. 22, 2021

(54) INTEGRATED FUNCTIONALITY OF CENTER DISPLAY, DRIVER DISPLAY, AND SHARED-EXPERIENCE DISPLAY

(71) Applicant: Byton North America Corporation, Santa Clara, CA (US)

(72) Inventors: Victoria Rush, San Jose, CA (US); Keijiro Ikebe, Cupertino, CA (US); Andre Nitze, Pipes Canyon, CA (US); Dominick Aviado, San Francisco, CA (US); Saurabh Rathi, Sunnyvale, CA (US); Jack Cong, Livermore, CA (US); Perry Chan, San Francisco, CA (US); Nicole Smith, San Jose, CA (US); Shyam Narayan, Dublin, CA (US); Neeraja Kukday, San Jose, CA (US); Yang Cao, San Jose, CA (US)

( * ) Notice: Subject to any disclaimer, the term of this patent is extended or adjusted under 35 U.S.C. 154(b) by 0 days.

(21) Appl. No.: 16/240,703

(22) Filed: Jan. 4, 2019

(65) Prior Publication Data
US 2020/0218487 A1     Jul. 9, 2020

(51) Int. Cl.
    *G06F 3/14*      (2006.01)
    *B60K 37/02*    (2006.01)
    (Continued)

(52) U.S. Cl.
    CPC ............ *G06F 3/1423* (2013.01); *B60K 37/02* (2013.01); *B60R 11/0229* (2013.01);
    (Continued)

(58) Field of Classification Search
    CPC combination set(s) only.
    See application file for complete search history.

(56) References Cited

U.S. PATENT DOCUMENTS

| | | | |
|---|---|---|---|
| 5,651,107 A | | 7/1997 | Frank et al. |
| 9,135,803 B1 * | | 9/2015 | Fields ............... G06Q 40/08 |

(Continued)

FOREIGN PATENT DOCUMENTS

| | | |
|---|---|---|
| CN | 103605489 A | 2/2014 |
| CN | 105824664 A | 8/2016 |

(Continued)

OTHER PUBLICATIONS

The International Search Report and Written Opinion of the International Searching Authority for PCT Application PCT/CN2019/130612 dated Mar. 26, 2020, 8 pages.

(Continued)

*Primary Examiner* — Wesner Sajous
(74) *Attorney, Agent, or Firm* — Womble Bond Dickinson (US) LLP

(57) ABSTRACT

Systems and methods for selecting a control mode to launch an application in a vehicle are described. For one embodiment, a system for selecting control modes for launching applications in a vehicle with a dashboard screen can include a computing device embedded in the vehicle, the computing device connected to the dashboard screen and a control display; and an operating system installed on the computing device, the operating system running a multi-display controller and one or more applications. The multi-display controller is to receive a request from the control display for launching an application, determine a control mode used to launch the application based on an integration level indicator of the application, and launch the application in the determined control mode. A metabar and a global widget can be created on top of the dashboard screen. The metabar is permanently displayed across the dashboard screen, and can contain environmental and driving-related information. The (Continued)

global widget appears contextually in response to a state change of a system component in the vehicle.

27 Claims, 20 Drawing Sheets

(51) Int. Cl.
    *G06F 3/048*     (2013.01)
    *G09G 5/14*     (2006.01)
    *G09G 5/37*     (2006.01)
    *B60R 11/02*     (2006.01)
    *G06F 3/0481*     (2013.01)
    *G09G 5/377*     (2006.01)
    *B60R 11/00*     (2006.01)

(52) U.S. Cl.
    CPC ............ *G06F 3/0481* (2013.01); *G09G 5/14* (2013.01); *G09G 5/377* (2013.01); *B60K 2370/52* (2019.05); *B60K 2370/55* (2019.05); *B60R 2011/001* (2013.01); *G09G 2380/10* (2013.01)

(56) References Cited

U.S. PATENT DOCUMENTS

| | | | |
|---|---|---|---|
| 10,296,173 | B2 | 5/2019 | Nezu et al. |
| 2003/0093187 | A1* | 5/2003 | Walker ................... B64C 13/20 701/1 |
| 2012/0046808 | A1* | 2/2012 | Furuta .................. G01C 21/362 701/2 |
| 2016/0328254 | A1 | 11/2016 | Ahmed et al. |
| 2017/0039084 | A1 | 2/2017 | Atsmon et al. |
| 2017/0075701 | A1* | 3/2017 | Ricci ................... G01C 21/3484 |
| 2018/0329718 | A1* | 11/2018 | Klein ...................... G06F 9/445 |
| 2019/0072405 | A1* | 3/2019 | Luchner ............. G01C 21/3652 |
| 2019/0138344 | A1* | 5/2019 | Spracklen ........... G06F 9/45558 |

FOREIGN PATENT DOCUMENTS

| | | |
|---|---|---|
| CN | 106909424 A | 6/2017 |
| CN | 108460860 A | 8/2018 |
| CN | 109002270 A | 12/2018 |
| CN | 109084803 A | 12/2018 |
| DE | 10046908 A1 | 4/2002 |
| DE | 102006049964 A1 | 4/2008 |
| EP | 1637386 B1 | 10/2007 |
| WO | 2018212927 A1 | 11/2018 |

OTHER PUBLICATIONS

The International Search Report and Written Opinion of the International Searching Authority for PCT Application PCT/CN2019/130627 dated Mar. 25, 2020, 9 pages.

The Non-Final Office Action for U.S. Appl. No. 16/240,701 dated Mar. 19, 2020, 27 pages.

The Non-Final Office Action for U.S. Appl. No. 16/240,706 dated Jan. 30, 2020, 16 pages.

* cited by examiner

INTEGRATED FUNCTIONALITY OF CENTER DISPLAY, DRIVER DISPLAY, AND SHARED-EXPERIENCE DISPLAY

FIELD OF INVENTION

Embodiments of the present disclosure are generally related to vehicle systems, and are particularly related to integrated functionality of control displays and shared-experience displays in a vehicle.

BACKGROUND

Present vehicles are increasingly computerized, and loaded with software applications. These software applications can include applications that are critical to the driving or piloting of the vehicle, and those that are not. The driving-critical applications can include an instrument cluster application, and the non-driving-critical applications can include one or more infotainment applications.

Some vehicles are designed with a single dashboard screen to be shared by a driver or pilot with passengers, so that both types of applications can be displayed on the same screen. For such vehicles, running both types of applications in one operating system would facilitate information display on the screen, but could present challenges for the safe operation of the vehicle.

For example, if the operating system crashes, all applications in the operating system, including the driving-critical applications, would be taken down. Running the two types of applications in separate computing systems, on the other hand, would require additional hardware, which is not only costly, but also increases design complexity of a vehicle.

SUMMARY

Systems and methods for selecting a control mode to launch an application in a vehicle are described. For one embodiment, a system for selecting control modes for launching applications in a vehicle with a dashboard screen can include a computing device embedded in the vehicle, the computing device connected to the dashboard screen and a control display; and an operating system installed on the computing device, the operating system running a multi-display controller and one or more applications. The multi-display controller is to receive a request from the control display for launching an application, determine a control mode used to launch the application based on an integration level indicator of the application, and launch the application in the determined control mode. A metabar and a global widget can be created on top of the dashboard screen. The metabar is permanently displayed across the dashboard screen, and can contain environmental and driving-related information. The global widget appears contextually in response to a state change of a system component in the vehicle.

BRIEF DESCRIPTION OF THE DRAWINGS

The figures of the accompanying drawings provide examples of embodiments. Like references indicate similar elements.

DETAILED DESCRIPTION

Figure 1:
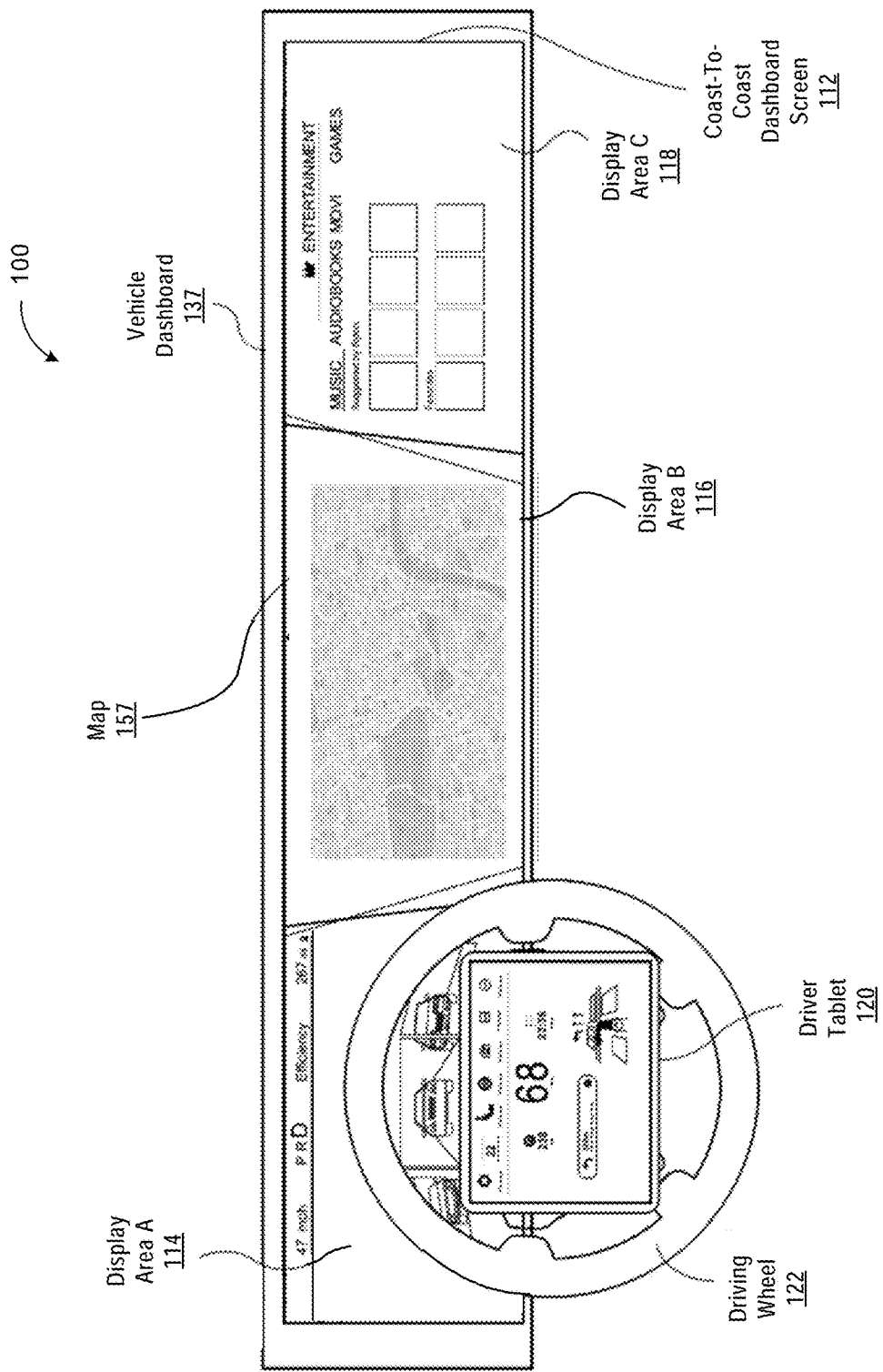
FIG. 1 illustrates one example of an inside view of a control environment 100 of a vehicle, in accordance with an embodiment.

The systems and methods for using multiple control displays to control displaying applications on a dashboard screen in a vehicle are described below. As used herein, a vehicle can be a road vehicle, such as an automobile, a van, a truck, and a bus; a train; an aircraft, such as an airplane; a spacecraft; or any machinery that transports people or things.

In the specification, reference "one embodiment" or "an embodiment" means that a particular feature, structure, or characteristic described in conjunction with the embodiment can be included in at least one embodiment. The appearances of the phrase "for one embodiment" or "for one embodiment" in various places in the specification do not necessarily all refer to the same embodiment.

For one embodiment, a system for selecting control modes for launching applications in a vehicle with a dashboard screen includes a computing device embedded in the vehicle, the computing device connected to the dashboard screen and a control display; and an operating system installed on the computing device, the operating system running a multi-display controller and one or more applications. The multi-display controller is to receive a request from the control display for launching an application, determine a control mode used to launch the application based on an integration level indicator of the application, and launch the application in the determined control mode.

For one embodiment, a user does not need to select which control mode to launch an application. The system can automatically determine a control mode to launch an application based on the level of integration of the application with a control display.

For one embodiment, a method for selecting control modes for launching applications in a vehicle with a dashboard screen includes receiving, at a multi-display controller running in an operating system installed on a computing device embedded in the vehicle, a request from a control display for launching an application; determining, by the multi-display controller, a control mode used to launch the application based on an integration level indicator of the application; and launching the application in the determined control mode.

For one embodiment, the computing device can be a single integrated circuit, a device including a plurality of chips integrated onto a motherboard, or a device including a plurality of integrated circuits. For another embodiment, the computing device can be part of a chipset, which includes a plurality of integrated circuits, wherein each of the plurality of integrated circuits in the chipset runs a same software stack.

For one embodiment, the control mode is one of a device mode, a casting mode, and a remote mode. When the control display in a device mode, the control display functions as a normal device. An icon on the control display can open an application on the control display. When the control display is in a casting mode, an image or video on the control display can be cast on the dashboard screen. When the control display is in a remote mode, the control display functions as a remote control device.

For one embodiment, the integration level indicator indicates how well features of the application interact with the control display, and can be determined based on frequency of user interactions required to operate the application after the application is launched. The integration level indicator is a numerical value that is calculated by the multi-display controller using a predetermined algorithm before launching the application. The control display is one of a first control display and a second control display. The first control display is positioned within a steering wheel of the vehicle. The second control display is positioned between a driver seat and a front passenger seat in the vehicle.

For one embodiment, the dashboard screen is to display a background color that matches an interior color scheme of the vehicle.

For one embodiment, the dashboard screen includes a metabar that is a persistently visible bar across the dashboard screen for information display. The dashboard screen further includes a global widget that is contextually created in response to a state change of a system component in the vehicle. The metabar can display environmental information, driving-related information, and notifications of state changes of system components in the vehicle. The system component changes that cause the global widget to be generated can include an incoming call, a volume adjustment of a media player, a Wi-Fi turn-off, an interior temperature change of the vehicle, and a Bluetooth state change. The global widget can disappear after a session associated with the state change of the system component is completed.

For one embodiment, a foreground service in the operating system can monitor a plurality of system components for a state change and can create the global widget in response to the state change. The foreground service includes a user interface component for creating the metabar, and a user interface component for creating the global widget.

For one embodiment, each of the first control display and the second control display includes a quick access menu that is to be turned on and turned off by a finger swiping. The second control display can be operated by a hand gesture within a predetermined distance of the second control display.

For one embodiment, the dashboard screen is a coast-to-coast dashboard screen, also referred to as a shared-experience display (SED) that is as wide as the width of the vehicle. The dashboard screen is to display a background color that matches an interior color scheme of the vehicle.

The embodiments and vehicles described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory.

The above summary does not include an exhaustive list of all embodiments in this disclosure. All systems and methods can be practiced from all suitable combinations of the various aspects and embodiments described in the disclosure.

The following description and drawings are illustrative and are not to be construed as limiting. Numerous specific details are described to provide a thorough understanding of various embodiments. However, in certain instances, well-known or conventional details are not described in order to provide a concise discussion of embodiments.

The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

FIG. 1 illustrates one example of an interior view of a control environment 100 of a vehicle. As shown in FIG. 1, the control environment 100 includes a dashboard screen 112 running substantially from one side to the other side of a vehicle dashboard 137. The coast-to-coast dashboard screen 112 can be a curved display (also referred to as SED 112) that substantially spans the width of the dashboard 137 and that is integrated into the dashboard 137. One or more graphical user interfaces can be provided in a number of display areas such as display areas A 114, display area B 116, and display area C 118.

Such graphical user interfaces can include status menus shown in, e.g., display areas A 114 and display C 118. For one embodiment, display area A 114 can show driving-critical information, such as instrument clusters, and rear view or side view or surround view images of the vehicle from one or more cameras, radars, or other sensors located outside or inside of the vehicle. For one embodiment, display area B 116 and display area C 118 can display non-driving-critical information. For example, display area B 116 can display a map application 157; and display area C 118 can display entertainment settings with preferences for music, audiobooks, movies, and games.

The dashboard 137 can include one more computing devices (not shown) or data processing systems to implement a human user recognition system and to execute the driving-critical and non-driving-critical applications.

For one embodiment, a user capture device can be mounted and located above the dashboard 137 and include a combination of some or all of a camera, radar, microphone/speaker, fingerprint detector, or other sensors for use in capturing information (e.g., facial images, voice data and/or fingerprint data of a driver or passenger). The human user recognition system can compare captured user information with pre-stored user signatures to authenticate a user for access to various electronic or driving controls of the vehicle. The electronic and driving controls of the vehicle can include interior electronic controls such as interfaces on the dashboard screen 112 and a driver tablet 120 mounted on a driving wheel 122. For example, the diver tablet 120 can provide a driver interface for accessing controls including settings and preferences for the vehicle. The coast-to-coast dashboard screen 112 can also display settings and preferences for an identified passenger, for example, personalized user interfaces, personalized seat controls, and personalized driving wheel controls.

Figure 2:
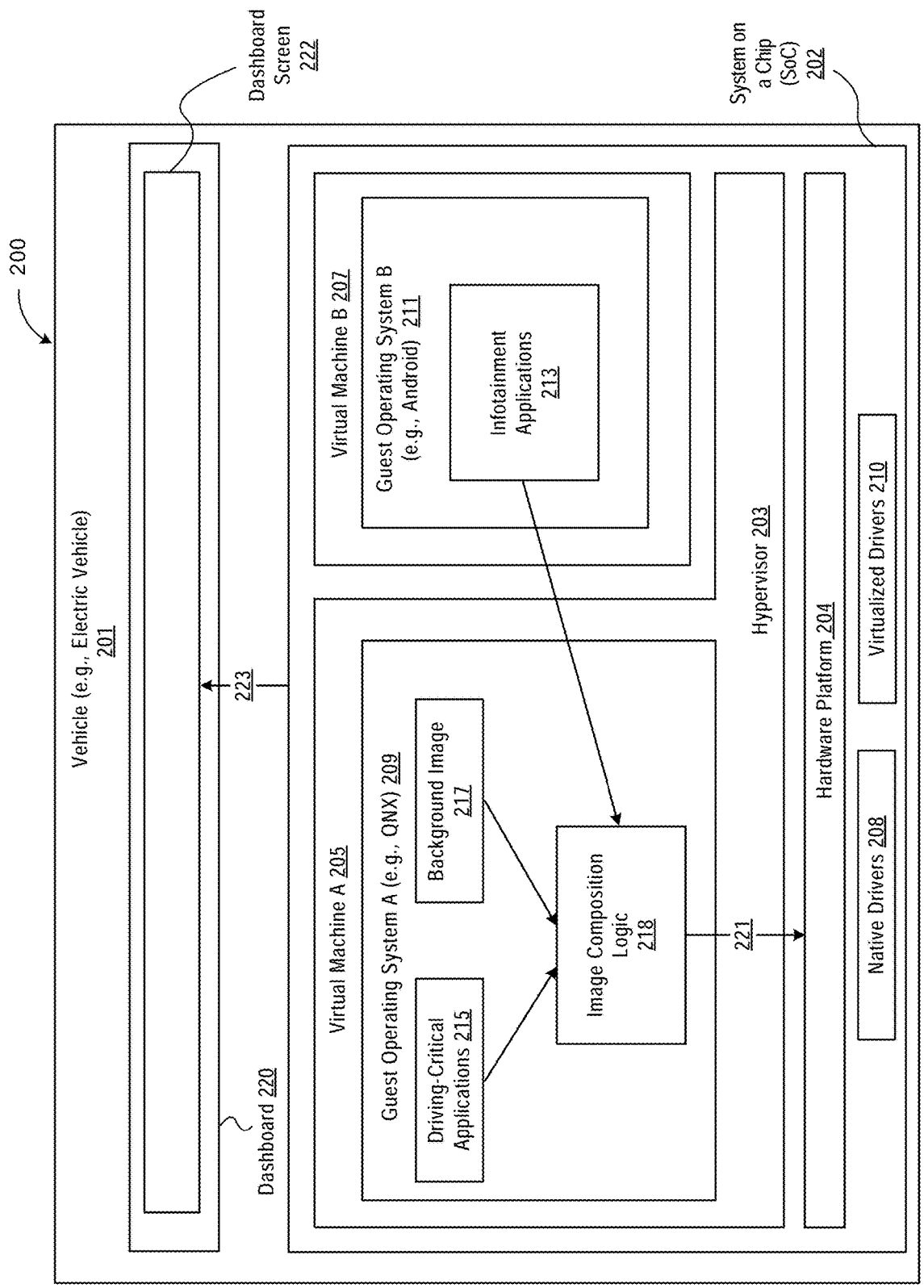
FIG. 2 shows, in block diagram form, an example system 200 for outputting from separate operating systems to a dashboard screen, such as the dashboard screen in FIG. 1, in accordance with an embodiment.

FIG. 2 shows, in block diagram form, an example system 200 for outputting from separate operating systems to a dashboard screen, such as the dashboard screen in FIG. 1. As shown in FIG. 2, a vehicle 201 can include a coast-to-coast dashboard 220 with a dashboard screen 222 mounted thereon, which can receive information for display from a computer device installed in the vehicle. The dashboard screen 222 can be the coast-to-coast screen 122 as described in FIG. 1.

For one embodiment, the computing device represents a system on a chip (SoC) 202, and can be installed under the dashboard 220 or another place within the vehicle. The SoC 202 can be an integrated circuit that incorporates required electronic circuits of numerous computer components onto a single chip, and be connected to the dashboard screen 222 using a physical cable, such as a HDMI or DVI cable, or using a wireless or Bluetooth connection. For one embodiment, the computing device can include multiple chips that are integrated onto a motherboard or into a single package. For one embodiment, the computing device can include multiple SOCs that are integrated into a single device.

The SoC 202 can include a number of virtual machines, for example, virtual machine A 205 and virtual machine B 207. The virtual machines are managed by a hypervisor 203. Each virtual machine can include a guest operating system (OS), for example, guest OS A 209 or guest OS B 211. Guest OS A 209 and guest OS B 211 can be different operating systems in terms of performance, functionality, security, and cost. For example, the guest operating system A 209 can be the QNX® operating system, and the guest operating system 211 can be Android operating system. Guest OS A 209 can run driving-critical applications, for example, instrument cluster applications 11; and guest OS B 211 can run non-driving critical applications, for example, infotainment applications 213.

For one embodiment, the hypervisor 203 can include guest OS A 209 and can be installed directly onto the SoC 202 without another operating system underlying the hypervisor 203. As such, the hypervisor has direct access to hardware platform 204 on the SoC 202 using native drivers 208, so that guest OS A 209 can control physical display functions of the SoC 202. Guest OS A 209 can include a number of high-performance features (e.g., microkernel architecture) and enhanced kernel-level security features (e.g., policy-based access control), to boost performance of the operating system, and to enhance the security of the operating system by preventing the operating system from being hacked, infected with viruses, or otherwise compromised or attacked.

Guest OS A 209 can be automatically booted when the hypervisor 203 is launched, and after a configurable period of time, guest OS B 211 can boot and run on top of guest OS A 209. Guest OS B 211 can access the hardware platform 204 (e.g., GPU) using virtualized drivers 210 to generate one or more frame buffers to hold information for rendering images from guest operating OS B 211. An image composition control logic 218 can be provided in guest OS A 209 to perform a predetermined algorithm for compose composite images from guest OS A 209 and guest OS B 211.

For one embodiment, the image composition logic 218 can be invoked when guest OS A is booted, and can operate to combine a pre-determined background image 217 and an image from driving-critical applications 215 to create a composite image, and send 221 the composite image to the hardware platform 204. The image composition logic 218 can also determine when to display images only from guest OS A 209 (e.g., when a vehicle is backing up), and when to display images only from guest OS B 211 (e.g., when the vehicle is parked). The hardware platform 204 can include a number of display control hardware devices, such as a GPU, a crypto engine, and a video encoder/decoder. The display control hardware devices can use their corresponding drivers 208 to display 223 the composite image to the dashboard screen 222.

For one embodiment, the composite image can be formed into a screen image matching the dashboard screen 222, and stored in a single frame buffer as a large bit map in RAM of a video card on the hardware platform 204. The video card can continually refresh the screen image as updates are received from guest OS A 209.

For one embodiment, after the guest operating system B 211 boots, it can create a transparent composite image from the infotainment applications 213, and send the transparent composite image to the guest operating system A 209, where the image composition logic 218 can combine the composite image with the composite image previously created, to create an overall composite image. The overall composite image, when being displayed on the dashboard screen, can show the seamless merging of the transparent image with the background image.

Figure 3:
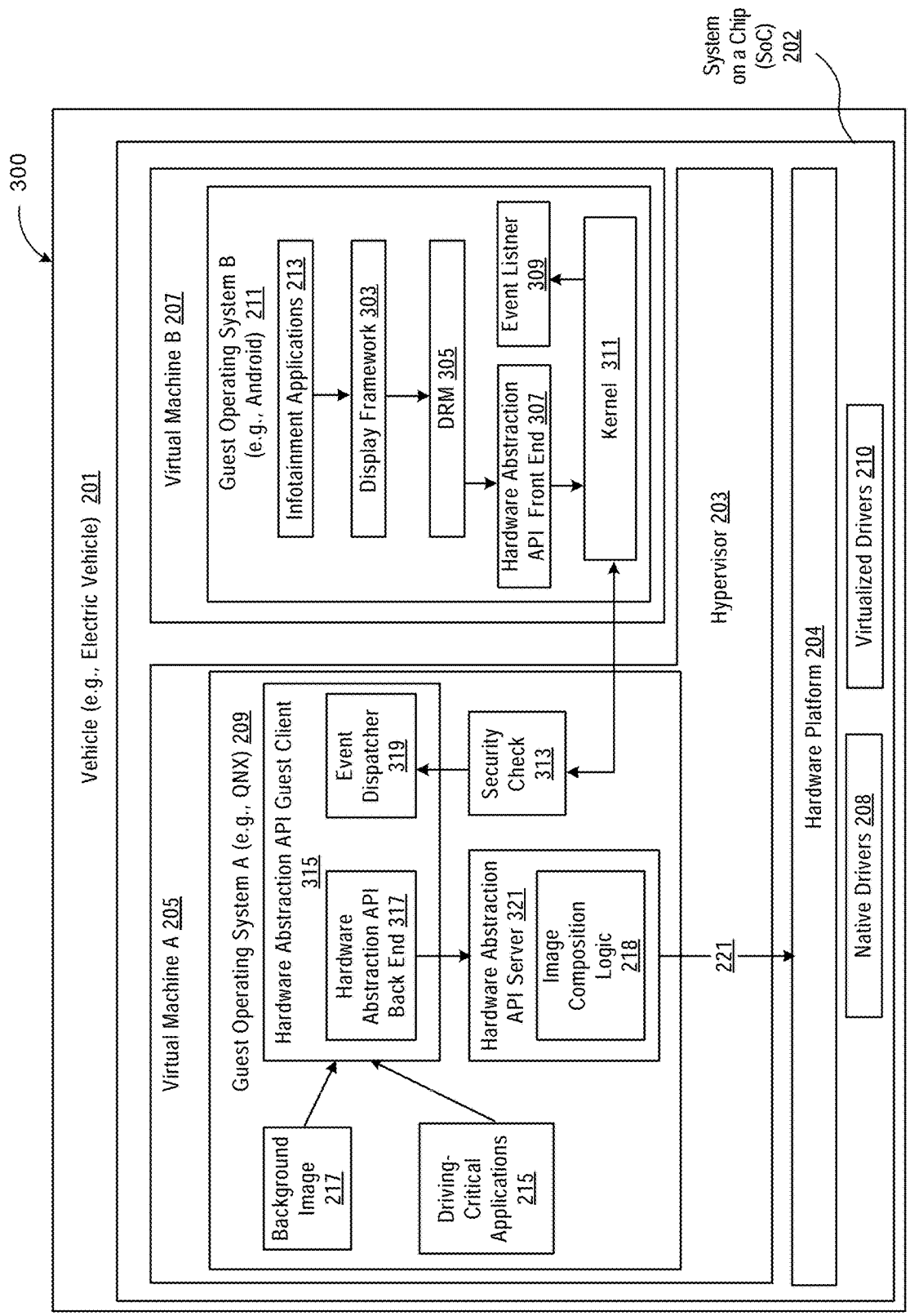
FIG. 3 shows, in block diagram form, an example data flow 300 in the example system described in FIG. 2, in accordance with an embodiment.

FIG. 3 shows, in block diagram form, an example data flow in the example system described in FIG. 2.

For one embodiment, a display framework 303 (e.g., an Android Display Framework) in guest OS B 211 can include a number of APIs and system services, which compose buffers of graphical data from the infotainment applications 213 into a single frame buffer. As used herein, a frame buffer can be a data structure that organizes memory resources needed to render an image.

A direct rendering manager (DRM) subsystem 305 can be called to manage the frame buffer, for example, by configuring display mode setting in a kernel space 311. Display mode settings for one embodiment can include display resolutions and color depth.

As further shown in FIG. 3, a hardware abstraction API guest client 315 can be provided in guest OS A 209 to operate as an interface, through which guest OS A 209 and guest OS B 211 communicate with each other. The interface can be secured by one or more security features 313, including digital signature verification and high assurance boot (HAB), so that only authenticated or trusted applications from guest OS B 211 can use the interface to communicate with guest OS A 209.

For one embodiment, the hardware abstraction API guest client 315 can include a hardware abstraction API backend 317, and an event dispatcher 319. When guest OS A 209 receives a request from a user—for example, a driver or passenger selecting a song to play at a control display—the event dispatcher 319 can launch an event, which can be processed by an event listener 309 registered with the event dispatcher 319. For one embodiment, an event can be any identifiable occurrence representing a message, token, count, pattern, value, or marker that can be recognized within an ongoing stream of monitored inputs. Examples of events that can be launched by the event dispatcher 319 can include a launching of an application from guest OS B 211.

The event listener 309 can subsequently cause the single frame buffer described above to be sent to guest OS A 209 through a hardware abstraction API front end 307, the kernel 311 and the virtualized drivers 210. The hardware abstraction API guest client 315 can also receive requests to display frame buffers representing he background image 217 and one or more driving-critical applications 215. The hardware abstraction API guest client 315, after receiving all the request display requests, can send the requests to a hardware abstraction API server 321. The image composition logic 218 in the hardware abstraction API server 321 can be invoked to composite images for display on the dashboard screen 222.

For one embodiment, the hardware abstraction API front end 307, the hardware abstraction API back end 317, the hardware abstraction API guest client 315, and the hardware abstraction API server 321 together can constitute a low-level hardware abstraction interface for composited windowing systems to utilize composition and display hardware on the SoC 202. In one example, the hardware abstraction interface can be the OpenWF™ API from Open Windowing Foundation™.

Figure 4:
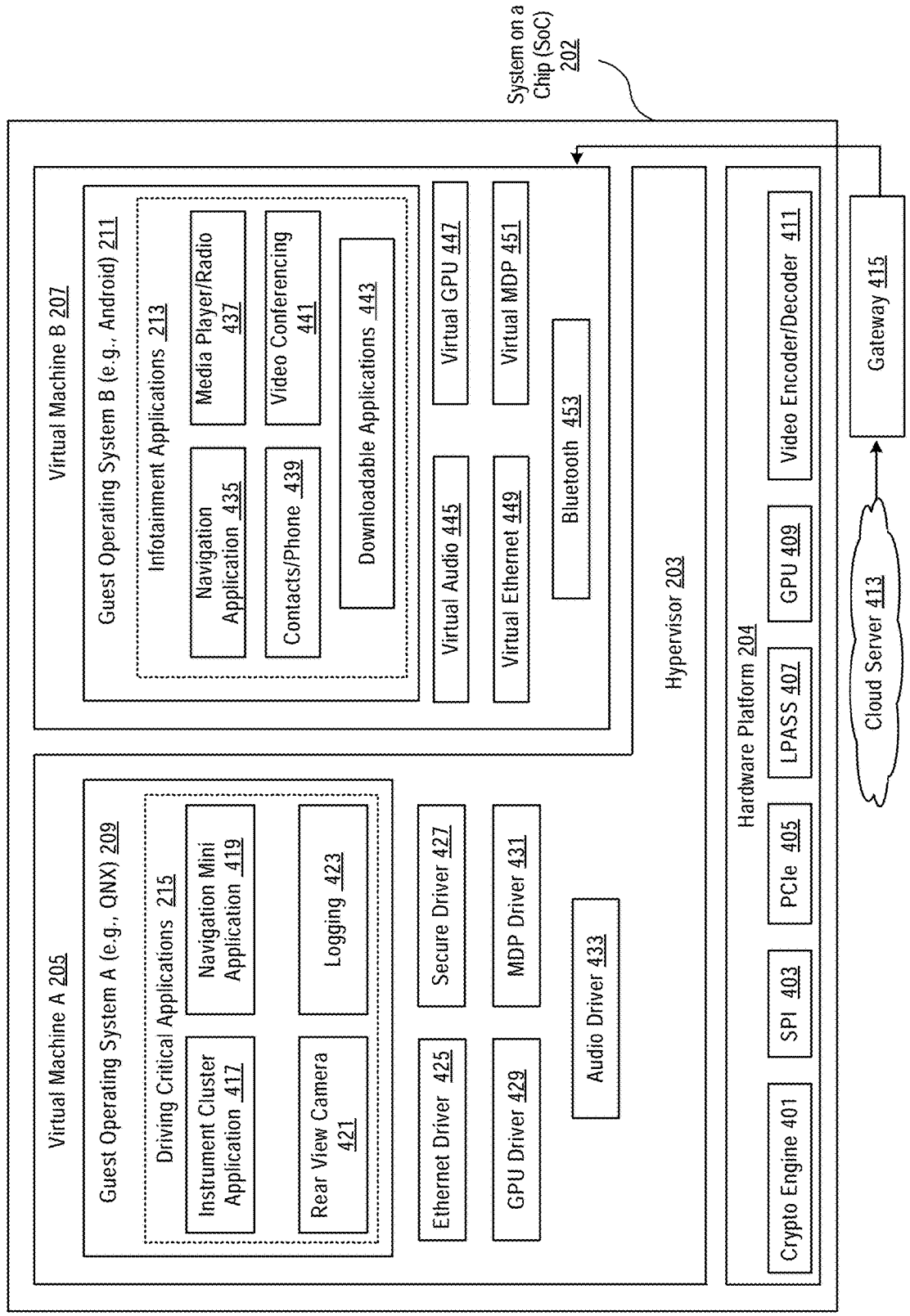
FIG. 4 shows, in block diagram form, example software applications installed in the example system described in FIG. 2, in accordance with an embodiment.

FIG. 4 shows, in block diagram form, examples of software applications installed in the example system described in FIG. 2.

As shown in FIG. 4, virtual machine B 208 can include a number of infotainment applications 213, for example, a navigation application (e.g., a Baidu map application) 435, a media player/radio application 437, a contacts/phone application 439, and a video conferencing application 441. The above applications can be installed in guest OS B 211. Further, additional applications 443 can be downloaded as needed from a cloud server 413 via a gateway.

For one embodiment, virtual machine B 207 also includes a number of virtualized devices, including a virtual GPU 447, a virtual audio device 445, a virtual Ethernet 449, a virtual Bluetooth 453, and a virtual resource manager 451 that uses a Markov Decision Process (MDP)-based algorithm. The virtual devices enable guest OS B 211 to share the hardware platform 204 with other operating systems on the SoC 202.

Guest OS A 209 can include a number of driving-critical applications 215, and a number of native drivers. Examples of driving-critical applications can include an instrument cluster application 417, a navigation mini application 419, a rear or surround view camera or radar application 421, and a logger 423. The native drivers can include an Ethernet driver 425, a security driver 427, a GPU driver 429, an MDP driver 431, and an audio driver 433. These drivers enable guest OS B 209 to directly interact with the hardware platform 204.

Figure 5:
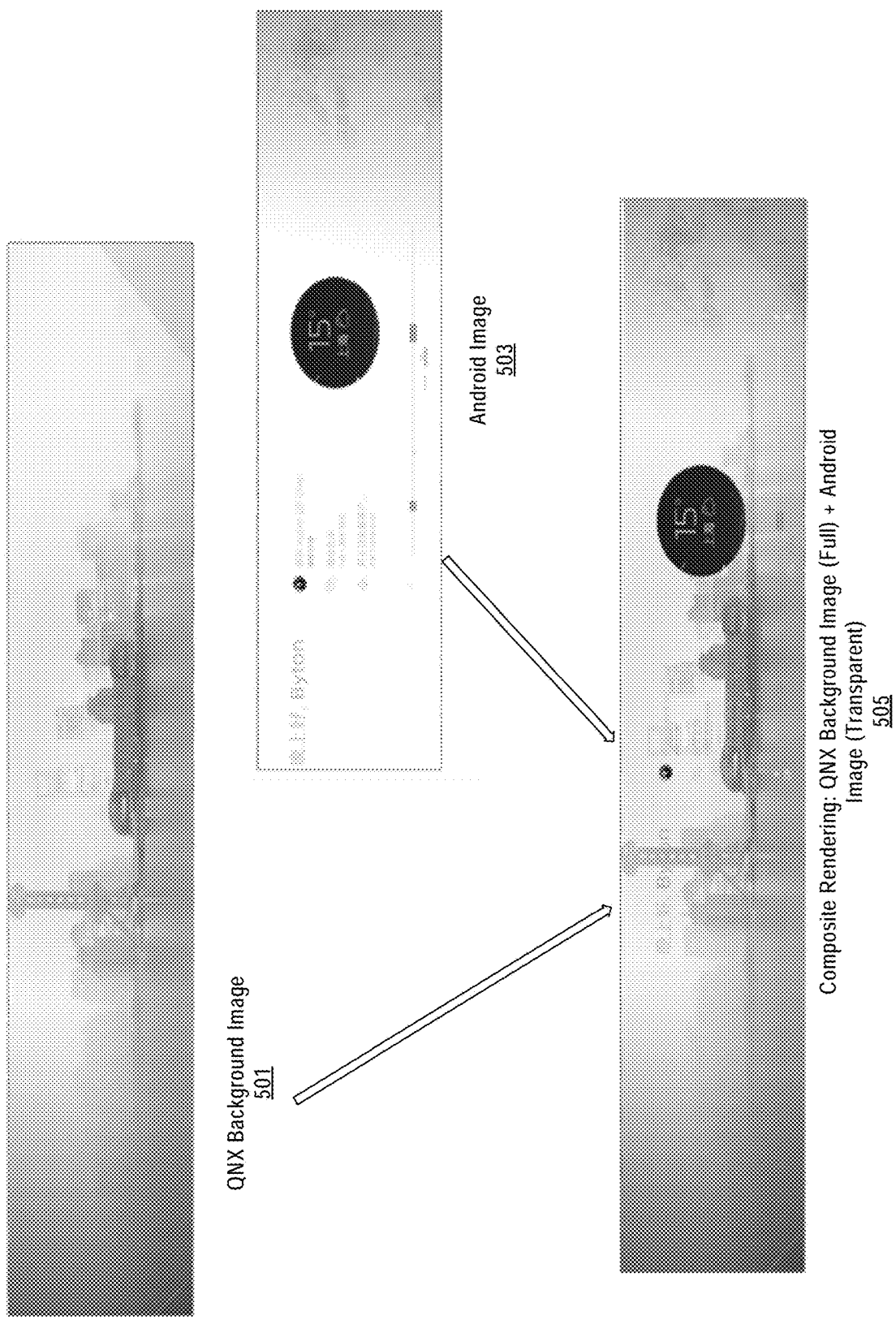
FIG. 5 shows one example process of creating a composite image for display on a dashboard screen.

FIG. 5 shows one example process of creating a composite image for display on a dashboard screen. In the figure, a background image 501 from a QNX operating system can be combined with an image 503 from an Android operating system to create a composite image 505. The image 503 is transparent, and therefore would appear seamlessly merged into the background image 501. In this example, the composition of the composite image 505 is made by the composition logic 218 using a hardware abstraction API in guest OS A 209 as described in FIG. 2, where no driving-critical application has been started yet for one embodiment.

Figure 6:
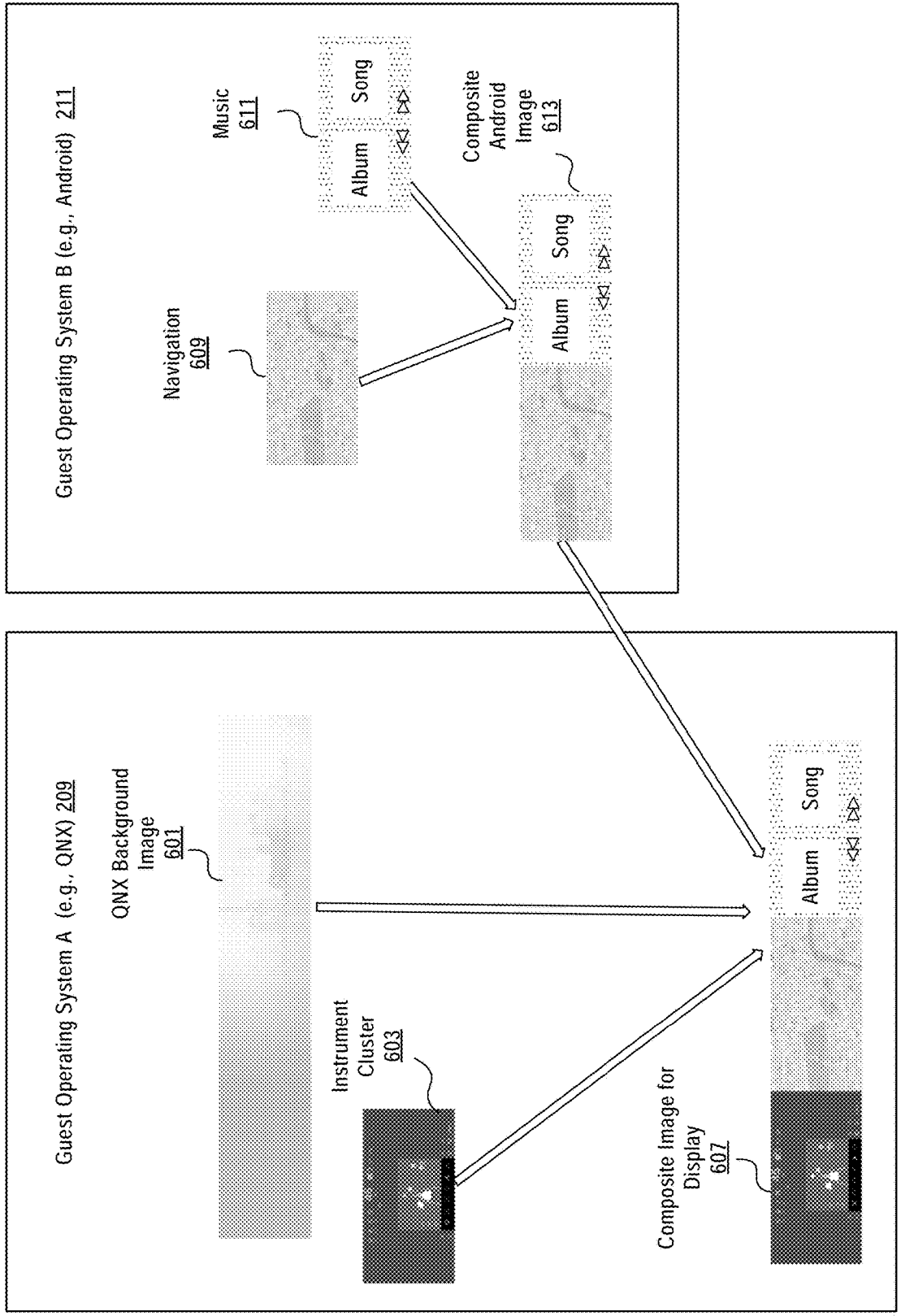
FIG. 6 shows another example process of creating a composite image for display on a dashboard screen, in accordance with an embodiment.

FIG. 6 shows another example process of creating a composite image for display on a dashboard screen. In this example, guest OS A 209 receives a composite image 613 from guest OS B 211. The composite image 613 is created by combining an image 609 from a navigation application and an image 611 from a media application. As described above, each image can be represented by a frame buffer. Guest OS A 209 can then create a composite image 607 for display on a dashboard screen from the received composite image 613, a background image 601, and an image from an instrument cluster application 603.

Figure 7:
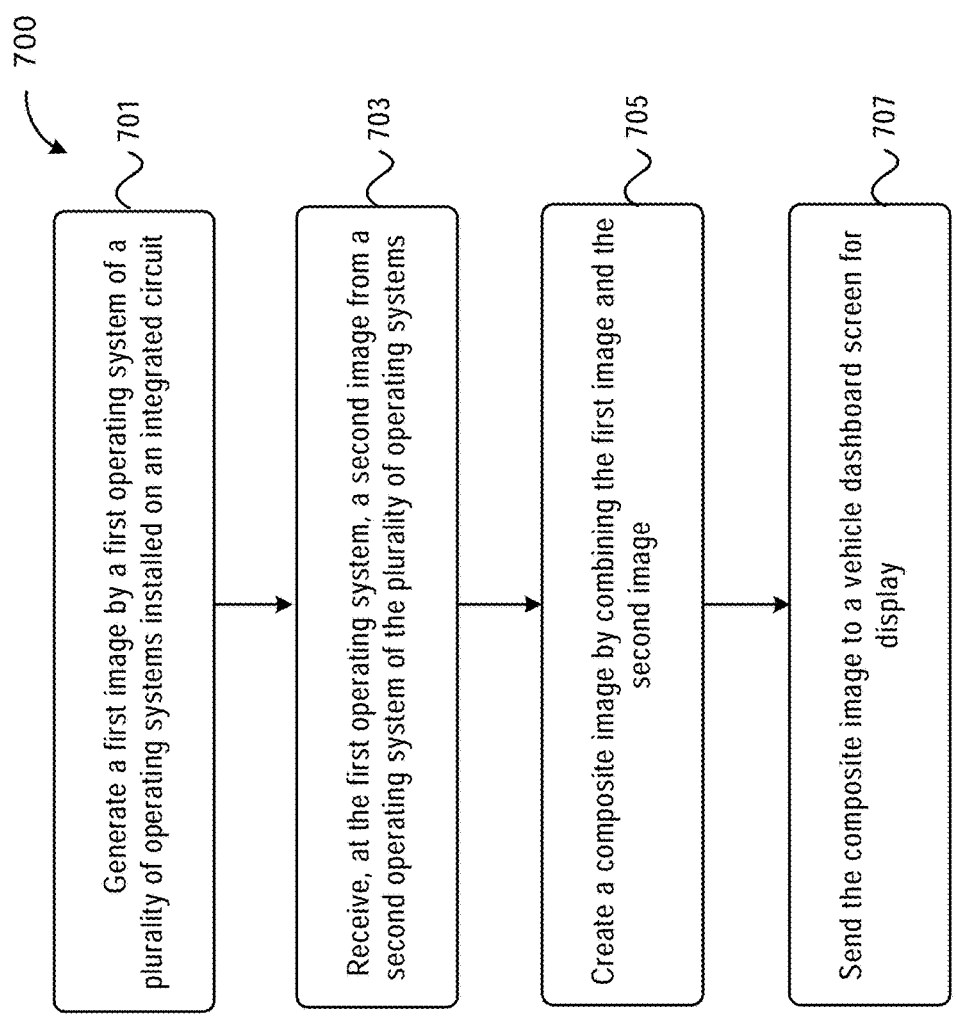
FIG. 7 is a flow diagram of one example method for outputting to a vehicle dashboard screen from a plurality of operating systems, in accordance with an embodiment.

FIG. 7 is a flow diagram of one example method for outputting to a vehicle dashboard screen from a plurality of operating systems. Method 700 can be performed by hardware (circuitry, dedicated logic, etc.), software (such as is run on a general purpose computer system or a dedicated machine), firmware, or a combination. For example, method 700 can use the system described in FIG. 2 or FIG. 3.

Referring to FIG. 7, in operation 701, a first operating system of a plurality of operating systems installed on an integrated chip. Each of the plurality of operating systems is installed in a separate virtual machine. The first operating system operates as a hypervisor that manages the plurality of operating systems, and includes a number of driving-critical applications. The integrated chip can be a System on a Chip (SoC). The first operating system may have direct access to one or more hardware display devices on the SoC.

In operation 703, the first operating system receives a second image from a second operating system of the plurality of operating systems. The second operating system can run infotainment applications, and can communicate with the first operating system through a secured interface. For one embodiment, an event listener in the second operating system can be registered with an event dispatcher in the first operating system, and can launch an event when the first operating system receives a user input or a system generated input. For one embodiment, an example system generated input is an input generated when the vehicle is parked. The registered event listener can process the event by prompting the second operating system to send one or more frame buffers representing one or more images to the first operating system. The one or more frame buffers may include display mode settings for displaying the images on a dashboard screen.

In operation 705, a composite image is created in the first operating system by combing the first image and the second image. A hardware abstraction API may be used when creating the composite image. The composite image may be represented by a single frame buffer with the mode settings received from the second operating system or a set of new mode settings provided by the first operating system.

In operation 707, the composite image can be sent to a video card on the SoC, where the video card can display the composite image at a predetermined frame rate on the dashboard screen in a vehicle.

Figure 8:
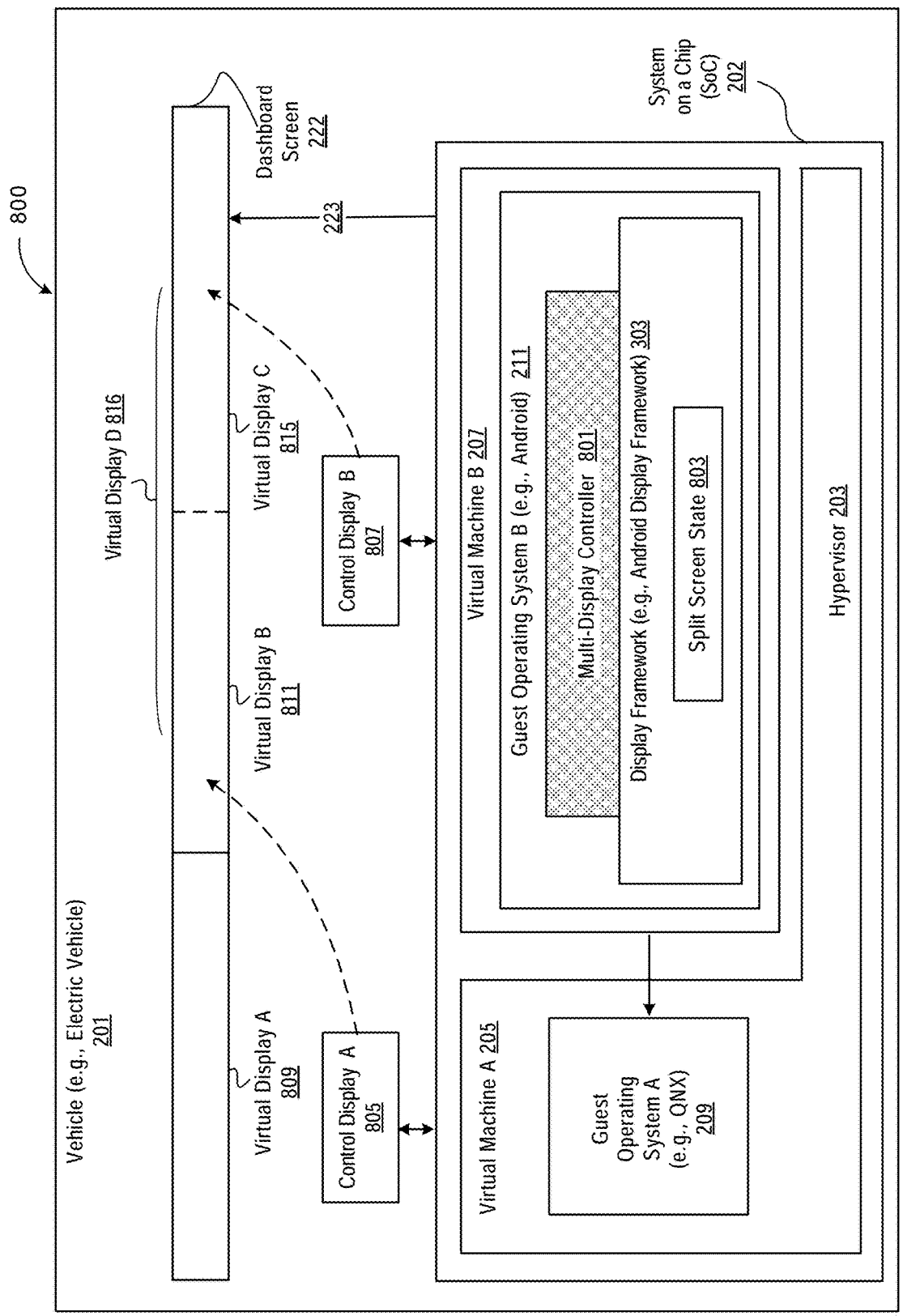
FIG. 8 shows, in block diagram form, an example system 800 for using multiple control displays to control displaying applications on a dashboard screen in a vehicle, in accordance with an embodiment.

FIG. 8 shows, in block diagram form, an example system 800 for using multiple control displays to control displaying applications on a dashboard screen in a vehicle, in accordance with an embodiment.

As shown in FIG. 8, the guest operating system B 211 can include a multi-window display controller 801, which can be built on the display framework 303. The display framework 303 can include APIs for creating virtual display areas in a single physical display, configuring the virtual display areas and the physical display (e.g., setting the size of the virtual display), and populating the virtual displays and the physical display with contents. The multi-window display controller 801 is a controlling application, and can implement and/or invoke one or more APIs in the display framework 303 to create virtual display A 809, virtual display B 811, virtual display C 815, and virtual display D 816 on the dashboard screen 222. Each of the virtual displays 809, 811, 815, and 816 is a logical subdivision of the dashboard screen 222 and can have its own display settings.

For one embodiment, virtual display A 809 can be configured to display only driving-critical applications, while virtual displays B 811, C 815, and D 816 can be configured to display non-driving-critical applications, such as infotainment applications. System 800 also includes control display A 805 and control display B. Control display A 805 can be positioned within a driving wheel of the vehicle 201 for use by a driver, while control display B 807 can be positioned between a driver seat and a front passenger seat, for use by both the driver and a passenger. Each of the control displays 805 and 807 can be a touchscreen tablet or another type of display that can display application menus and receive user inputs for selecting applications. Each of the control displays 805 and 807 can be connected to the SoC 202 through a physical cable, a wireless connection or a Bluetooth connection.

For one embodiment, each control display 805 or 807 can be configured to control a particular virtual display. For example, control display A 805 is configured to control virtual display B 811, and control display B 807 is configured to virtual display C 815. Control display B 807 can show an application menu, where a driver or passenger can select an application for display on virtual display C 815. The menu of applications on control display B 807 can include infotainment applications, for example, a media player, a radio, a map, a game, and a restaurant searching application. The menu of applications on control display A 805 can be a driving-relevant subset of the menu of applications on control display B 807 (e.g., climate control, mapping applications). An application (e.g., a game) that is considered to be distractive can be shown on control display B 807, but may not be shown on control display A 805.

Control display A 805 can include a function for enabling and disabling a split-screen mode of the dashboard screen 222. For one embodiment, a driver can use the function to disable or enable the split-screen mode while the vehicle is in motion. However, the split-screen mode can be automatically disabled in some circumstances, for example, when the vehicle is backing up, the driver can disable the split-screen mode. When the split-screen mode is disabled, the whole dashboard screen 222 can be occupied by instrument cluster applications or a set of other types of applications, and the menu of applications on either control display A 805 or control display B 807 will be also disabled; an user input on either control display 805 or 807 will not trigger an action on the dashboard screen 222.

For one embodiment, when the split-screen is disabled, a split-screen state indicator 803 can be saved to an object (e.g. by resetting the value of a property of the object) in the multi-window display controller 801, which can check the state before launching any application on the dashboard screen 222.

For one embodiment, virtual display D 816 can be used to display an application when the application is launched from both control display A 805 and control display B 807. Virtual display D 816 can be a composite virtual display of virtual display B 811 and virtual display C 815. Virtual display A 809, which shows instrument cluster applications, can be controlled by a third control display.

Figure 9:
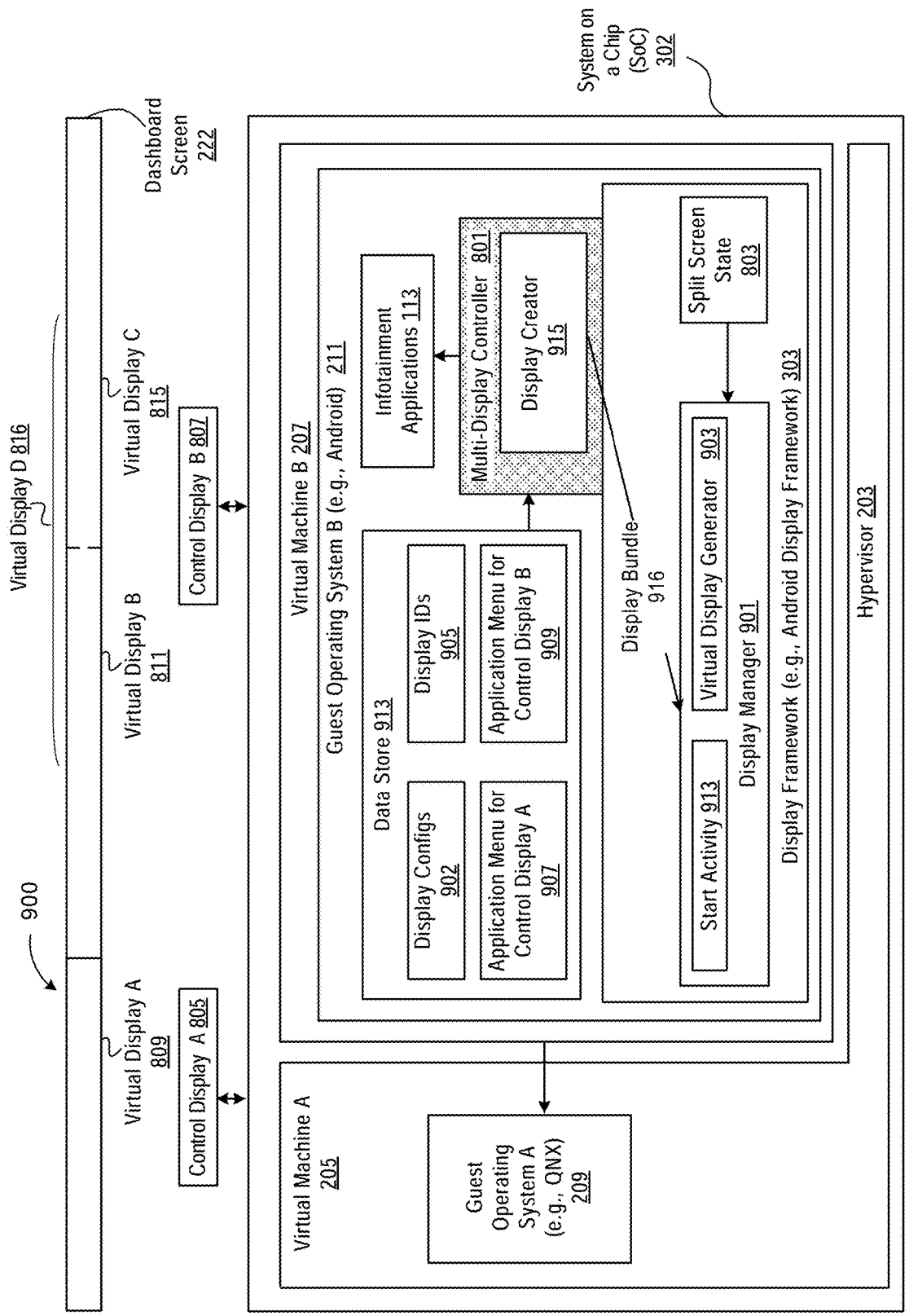
FIG. 9 shows, in block diagram form, another example system 900 using multiple control displays to control displaying applications on a dashboard screen in a vehicle, in accordance with an embodiment.

FIG. 9 shows, in block diagram form, another example system 900 using multiple control displays to control displaying applications on a dashboard screen in a vehicle, in accordance with an embodiment.

System 900, which further illustrates system 800, includes a data store 913 (e.g., a database) for display settings and display contents for the system. For one embodiment, the data store 913 can include display configurations 902, display IDs 905, application menu for control display A 907, and application menu for control display B 909. The display configurations 902 can include display settings (e.g., window size and resolution) for each physical display or virtual display. The display IDs 905 can include an identifier for each physical display and virtual display, each virtual display ID corresponding to one physical display ID. The application menu for control display A 907 includes a menu of applications to be displayed on control display A 805. The application menu for control display B 909 includes a menu of applications to be displayed on control display B 807.

For one embodiment, display settings for each physical display or virtual display can have a set of default values, which can be adjusted through one or more control displays (e.g., control display A 805). Similarly, each of the application menu for control display A 907 and the application menu for control display B 909 can also include a default application list, which can be adjusted via a user interface (not shown). The display IDs 905 can be provided by the display framework 303, which can detect any physical display plugged into the SoC 302, and can generate an identifier for each virtual display to be created on the physical displays 805, 807 and 222.

For one embodiment, a display creator 915 can implement a pre-determined algorithm for displaying contents on each of the physical displays 805, 807 and 222, and for using the control displays 805 and 807 to control the contents of the physical display 222. The display creator 915 can pass a display bundle 916 to the display manager 901. The display bundle 916 can include a source display ID, a target display ID, contents to be displayed on a physical or virtual display, and display settings for the physical or virtual display. If the target display ID is for either control display A 805 or control display B 807, the display creator 915 can default the source display ID to zero or to the target display ID. The display manager 901 can display the application menus 907 and 909 on control display A 805 and control display B 807 respectively.

However, if the target display ID is for the dashboard screen 222, the display manager 901 can check the split-screen state 803. If the split-screen state 803 indicates that the split-screen mode is disabled, the display manager 901 can generate a blank image, which can be sent to the guest operating system A 209 and combined therein with outputs from guest operating system A 209 into a composite image for display on the dashboard screen 222. If the split-screen mode is enabled, the display manager 901 can check the source display ID in the display bundle 916, and display one of the infotainment applications 113 on the dashboard screen 222. The virtual display that shows the infotainment application corresponds to a control display identified by the source display ID in the display bundle 916.

For example, if the control display where the infotainment application is selected is control display A 805, the infotainment application will be displayed on virtual display B 811. If the control display wherein the infotainment application is selected is control display B 807, the infotainment application will be displayed on virtual display C 815. If the infotainment application has been launched on a virtual display 811 or 815 through one of the control displays 805 and 807, launching the same infotainment application through the other control display 805 or 807 will cause the virtual display 811 or 815 to expand and become virtual display 816, where the infotainment information launched earlier can maintain its progression state.

As an illustrative example, if a map application is launched through control display A 805 on virtual display B 811, and a driving direction from city A to city B has been selected, launching the map application from control display B 807 will cause the running map application on virtual display B 811 to continue displaying the driving direction on virtual display D 816, which represents a merged virtual display between virtual display B 811 and virtual display C 815.

As further shown in FIG. 9, for one embodiment, the display manager 901 can include a virtual display generator 903 for creating a virtual display. The virtual display generator 903 can create a virtual display using information in the display bundle 916, which can include the virtual display's name, width, height, density in DPI, and an application to be displayed in the virtual display, and an identifier for the virtual display. A start activity method 913 in the display manager can launch an activity (either displaying an application menu or an application) on a physical display or virtual display indicated by a target display ID.

Figure 10A:
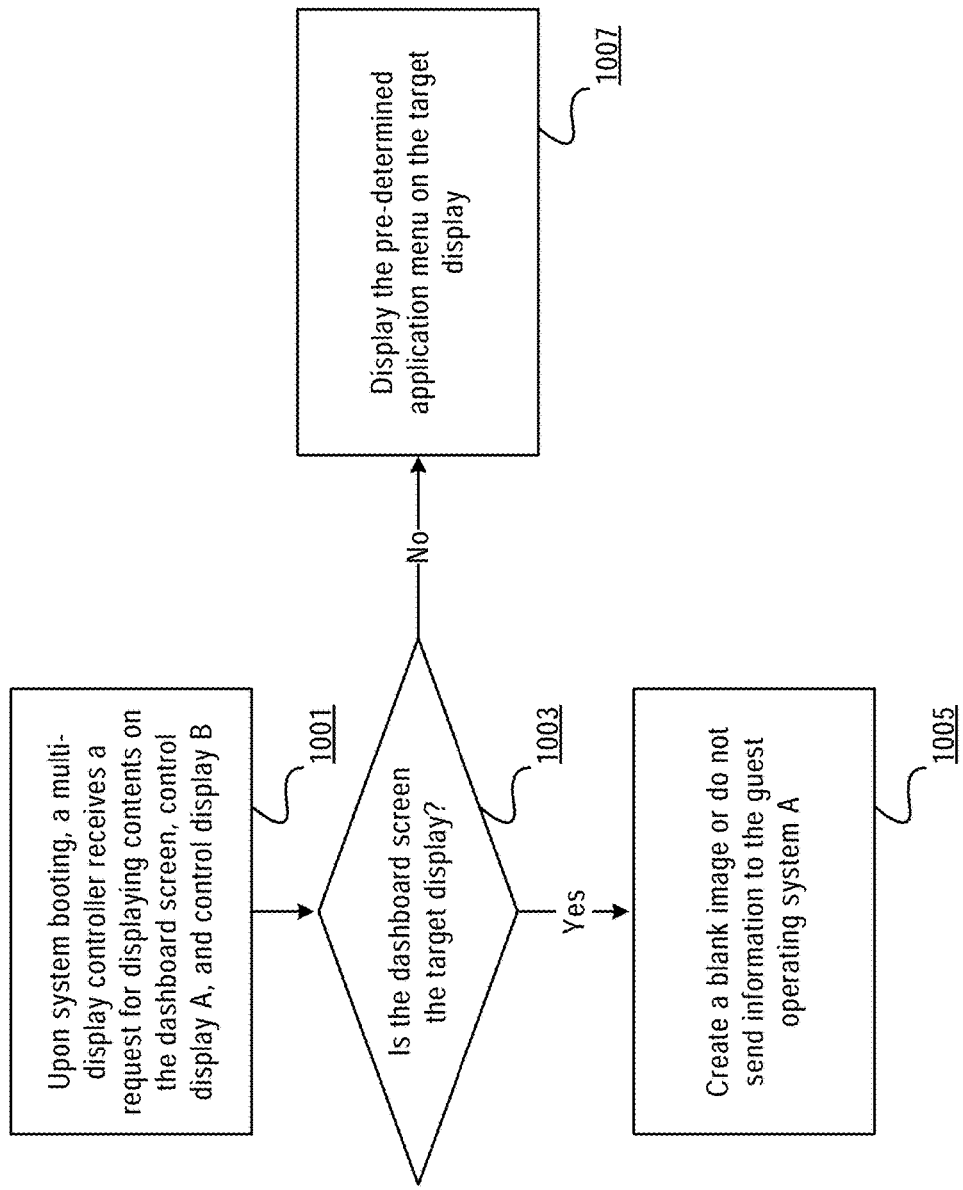
FIGS. 10A-10B illustrates example flow diagrams of using a multi-window display controller to control a coast-to-cost dashboard screen, in accordance with an embodiment.
Figure 10B:
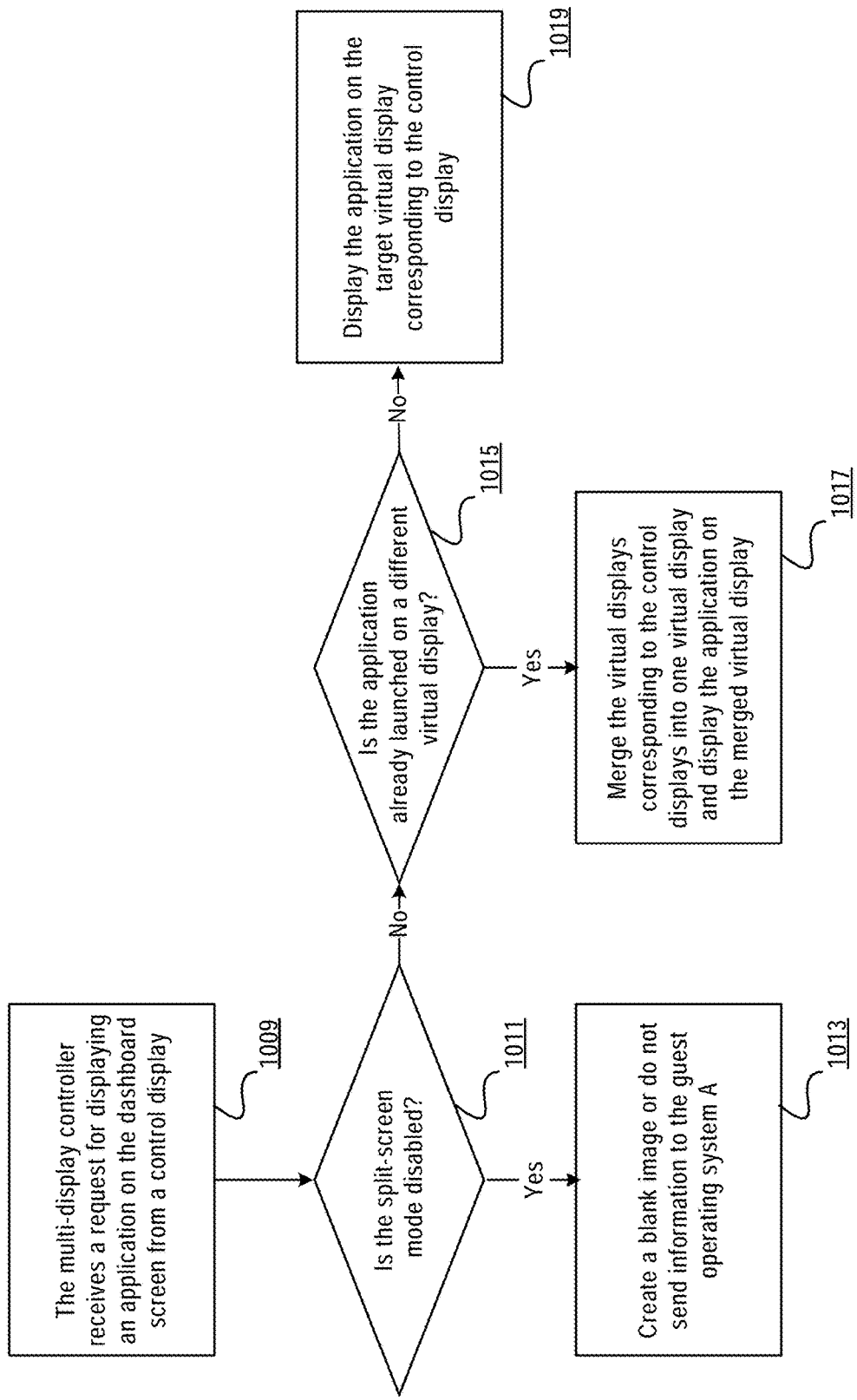

FIGS. 10A-10B illustrates example flow diagrams of using a multi-window display controller to control a coast-to-cost dashboard screen, in accordance with an embodiment.

For one embodiment, FIG. 10A illustrates an example flow diagram when the example system described in FIG. 9 reboots. As shown in FIG. 10, at step 1001, when the system reboots, a multi-window display controller (e.g., the multi-window display controller 801 in FIG. 8) receives a request from the system to populate the control displays (e.g., control display A 805 and control display B 807 in FIG. 9), and the dashboard screen 222. The multi-window display controller can receive a target display ID from the system, the target display ID representing a physical display, which can be the dashboard screen or one of the control displays. At step 1003, the multi-window display controller can determine whether the target display is the dashboard screen or a control display. If the target display is the dashboard screen as shown at step 1005, the multi-window display controller can invoke a display manager (e.g., the display manager 901 in FIG. 9) to generate a blank image and send the blank image to a guest operating system that runs instrument cluster applications (e.g., guest operating system B 209 in FIG. 9). However, if the target display is a control display as shown at step 1007, the multi-window display controller can invoke the display manager to display a predetermined application menu on that control display. Therefore, when the system reboots, the dashboard screen can show instrument clusters applications only, and each control display can show its pre-determined application menu.

FIG. 10B illustrates a flow diagram for launching applications on the dashboard screen using the control displays. As shown in FIG. 10, at step 1009, the multi-window display controller receives a request from a control display for launching an application on a target virtual display on the dashboard screen. At step 1011, the multi-window display controller can check whether the split-screen mode is disabled. If the split-screen mode is disabled, as shown at step 1013, the multi-window display controller can invoke a display manager to generate a blank image and send the blank to a guest operating system running instrument cluster applications.

If the split-screen mode is not disabled, the multi-window display controller can check whether the application has been launched on a virtual display other than the target virtual display on the dashboard screen, as shown at step 1015. At step 1017, the application has been launched on a different virtual display on the dashboard screen through another control display, and the multi-window display controller can combine the different virtual display and the target virtual display, and continue displaying the launched application on the combined virtual display. At step 1019, the application has not been launched through another control display, and the multi-window display controller can launch the application on the virtual display corresponding to the control display.

Selection of Control Modes

Figure 11:
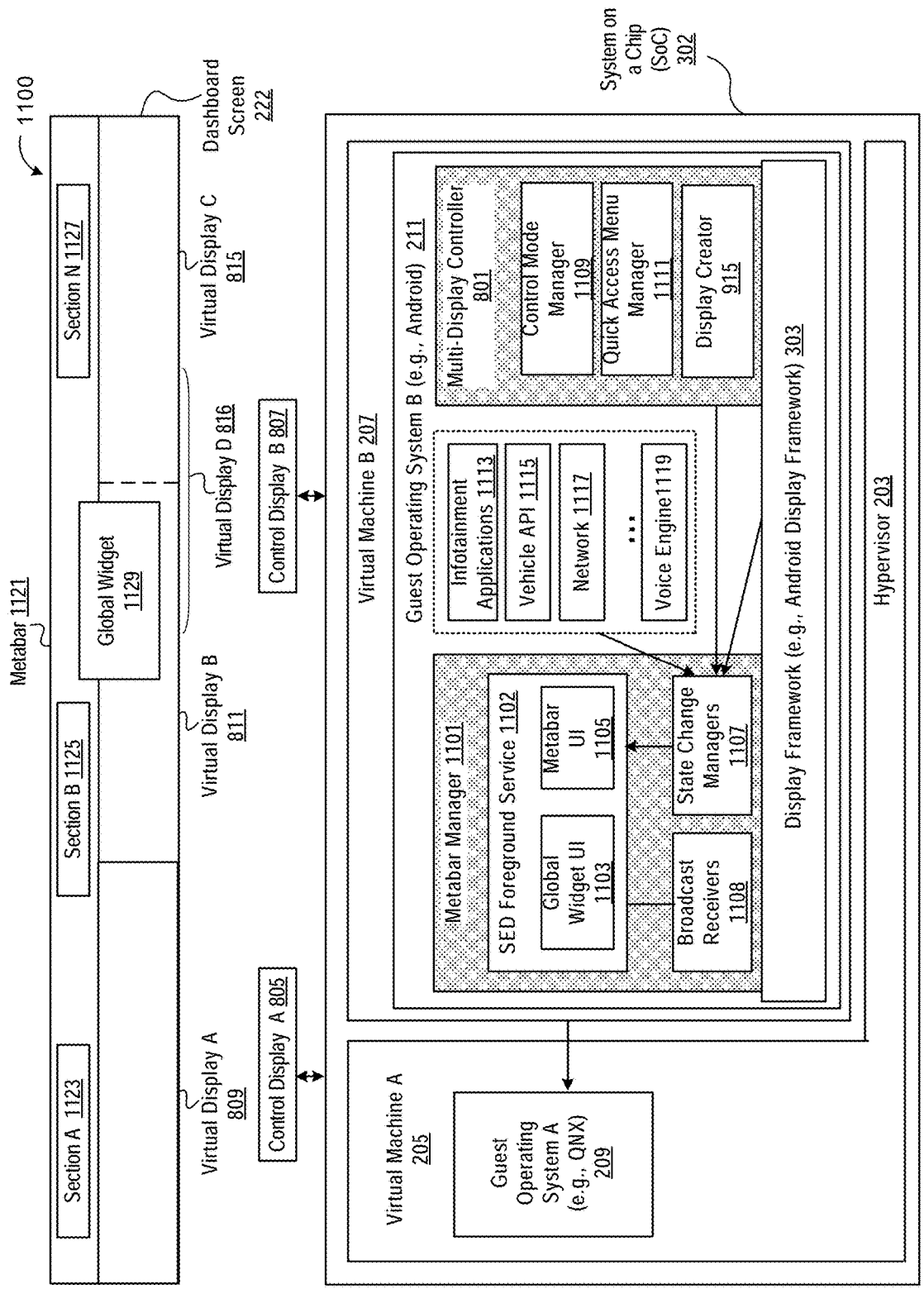
FIG. 11 shows, in block diagram form, an exemplary system for creating a metabar and a global widget on a dashboard screen of a vehicle in accordance with an embodiment.

FIG. 11 shows, in block diagram form, an exemplary system for creating a metabar and a global widget on a dashboard screen of a vehicle in accordance with an embodiment.

As shown in FIG. 11, a system 1100 can include a metabar manager 1101 that runs in guesting operating system B 211. The metabar manager 1101 can include a number of state change managers 1107 for monitoring state changes of system components in the vehicle. Examples of the state change managers 1107 can include one or more data managers for monitoring data changes in the vehicle. Examples of the data changes can include a user profile change, a car-related change (e.g., a seat setting change), a weather data change, and a temperature change inside the vehicle. The state change managers 1107 can also include one or more system service managers for monitoring a number of services within the vehicle. Examples of the system services can include a Wi-Fi service, a telephony service, and a Bluetooth service.

For one embodiment, when one of the state change managers 1107 detects a state change of a system component, the state change manager can notify the SED foreground service 1102. One or more broadcast receivers 1108 that have been registered with the SED foreground service 1102 can receive the state change of the system component. The SED foreground service 1102 can display the progression of the state change of the system component on a global widget 1129. Once the state change is completed, the global widget 1129 can disappear and the changed state can be displayed on a metabar 1121 in one of a number of sections 1123, 1125, and 1127. Examples of system components that generate a state change include a network component 1117, a voice engine 1119, and a vehicle setting application from the infotainment applications 1113.

For one embodiment, one of the state change managers 1107 can receive a notification from an application running in guest operating system B 211. One or more of the broadcast receivers 1108 can receive the notification, and display the notification directly in one of the number of sections on the metabar 1121. For example, such a notification can be an outside temperature or a current location of the vehicle detected by a vehicle API 1115.

For one embodiment, the metabar 1121 and the global widget 1129 are respectively generated by a metabar user interface component 1105 and a global widget user interface component 1103 in the SED foreground service 1102. Either the metabar 1121 or the global widget 1129 can be in a layer above one or more non-driving-critical applications and one or more driving-critical applications displayed on the dashboard screen 222.

As further shown in FIG. 11, a control mode manager 1109 can be provided in the multi-display controller 801. The control mode manager 1109 can determine which control mode that control display A 805 or control display B 807 uses to interact with the dashboard screen 222.

For one embodiment, each of control display A 805 or control display B 807 can be in one of a number of control modes, including a device mode, a casting mode, a remote mode, and a smart mode. When a control display is in a device mode, the control display functions as a normal device. An icon on the control display can open an application on the control display. For one embodiment, a control display in a device mode can behave like mobile device, and does not have interaction with the dashboard screen 222. When a control display is in a casting mode, an image or video on the control display can be cast on the dashboard screen 222 in a similar manner that a user uses a phone to send a video or image to a home TV. When a control display is in a remote mode, the control display functions as a remote control device. From the control display, a user can launch an application on the dashboard screen 222 in one of the virtual displays 811, 815 and 816. After the application is launched, the control display can start to function as a trackpad to enable the user to control the launched application. The trackpad provides a touch-sensitive surface that allows the user to manipulate and interact with the launched application through finger gestures or palm gestures.

For one embodiment, a control display can be in a smart mode, which allows a user to turn on and turn off a quick access menu by swiping down or swiping up using a hand or finger gesture. For example, a user can swipe down at a predetermined distance across the control display (either control display A 805 or control display B 807) using a three-finger gesture. The quick access menu can be a list of predetermined applications displayed the dashboard screen 222. The user can select an application from the application list by using a finger gesture. The generation and control of the quick access list can be performed by a quick access manager 1111 in the multi-display controller 801, or the control mode manager 1109.

Figure 12:
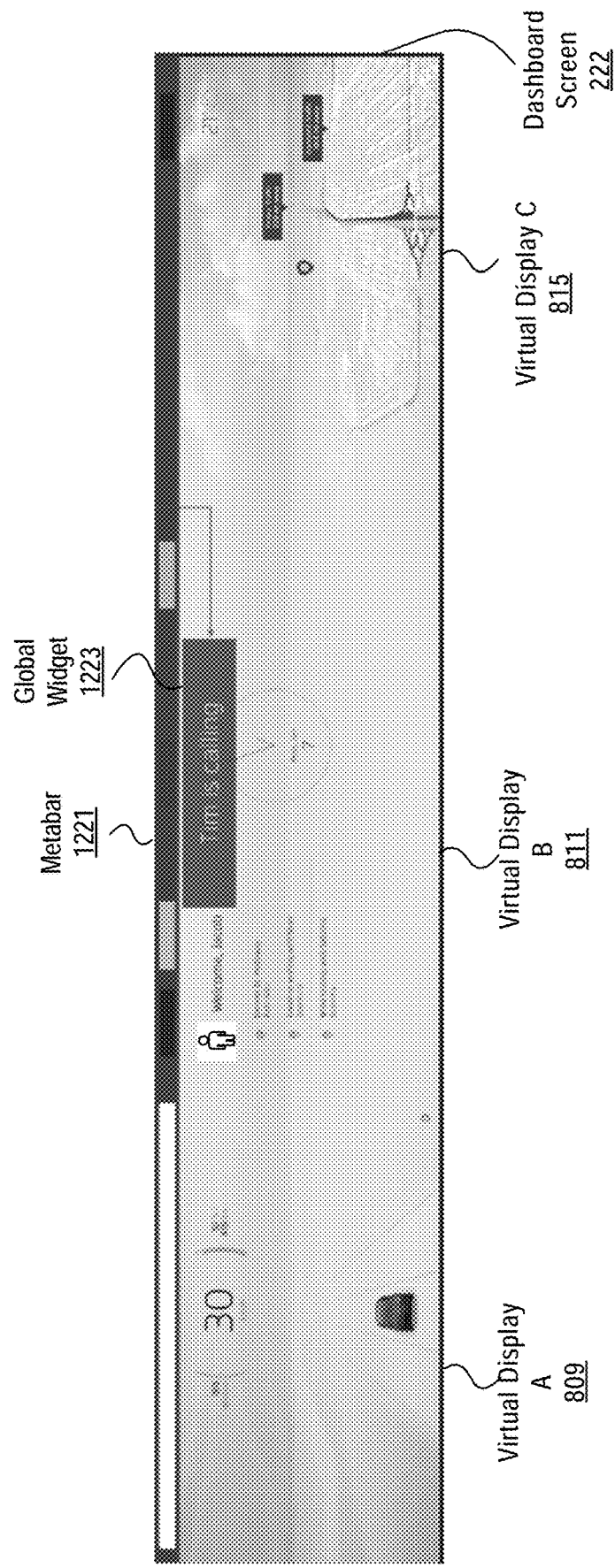
FIG. 12 illustrates an exemplary metabar and an exemplary global widget in accordance with an embodiment.

FIG. 12 illustrates an exemplary metabar and an exemplary global widget in accordance with an embodiment.

In the figure, a metabar 1221 can include a number of sections (zones). Examples of the sections can include warning symbol zone, an ABS zone, an individual zone, a name zone, an outdoor temperature zone, a voice avatar zone, a Logo zone, a drive mode status zone, a connectivity zone, a Wi-Fi/hotspot zone, and a Long-Term Evolution (LTE) zone.

For one embodiment, a global widget 1223 showing an incoming call is displayed on top of one or more non-driving-critical applications and one or more driving-critical applications. As described above, the global widget 1223 can show the progression of the call. When the call is over, the global widget 1223 would disappear.

Figure 13:
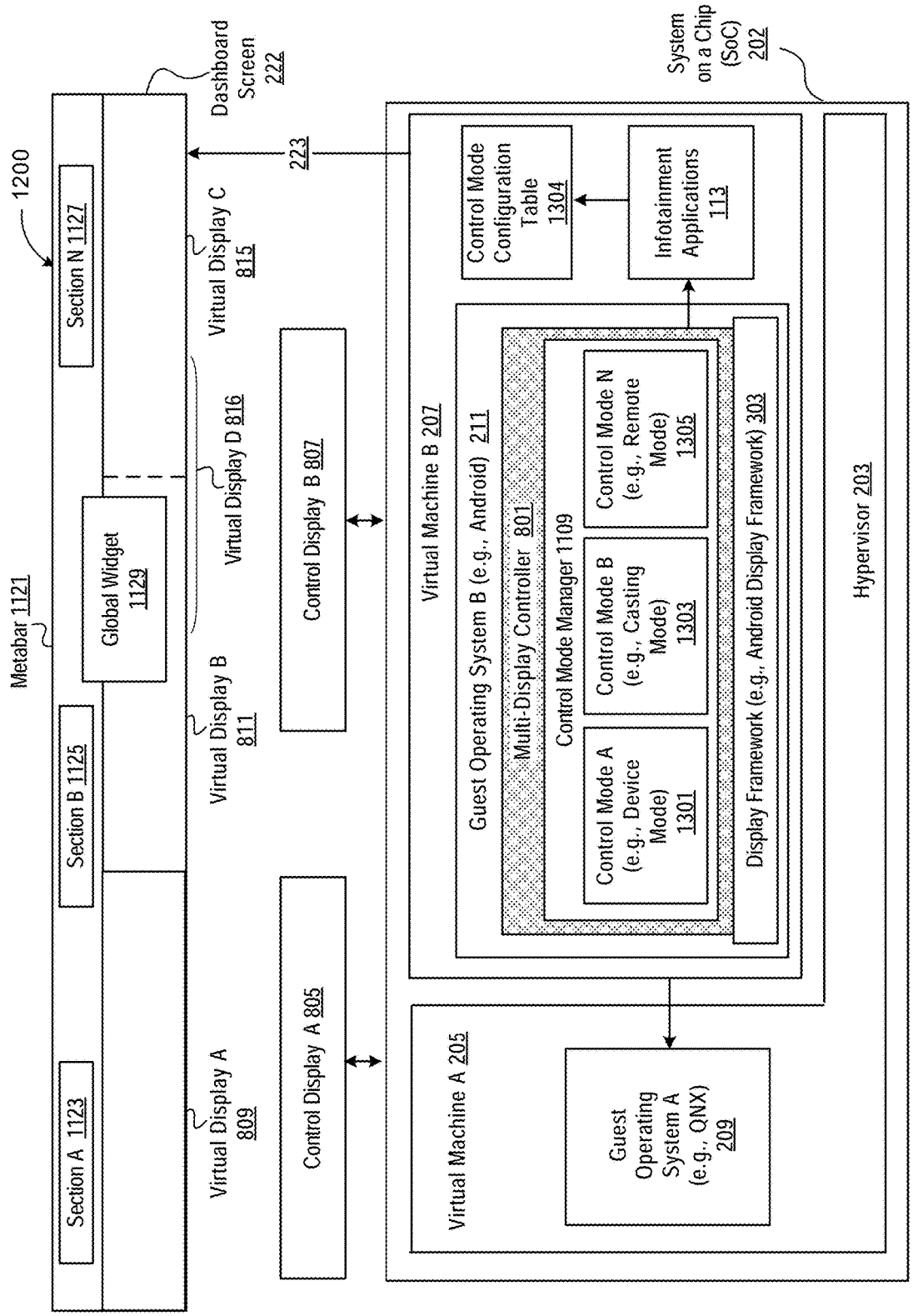
FIG. 13 shows, in block diagram form, an exemplary system for determining a particular control mode for an application in accordance with an embodiment.

FIG. 13 shows, in block diagram form, an exemplary system for determining a particular control mode for an application in accordance with an embodiment.

As shown in FIG. 13, the control mode manager 1109 can include a number of control mode components 1301, 1303, and 1305. Each control mode component can be used to launch an application in a particular control mode.

For one embodiment, the control mode components can include a device mode component, a casting mode component, a remote mode component, and a smart mode component. Which control mode that a control display uses to launch an application can be determined based on the integration level of the application. Each application to be launched from a control display is associated with an integration level indicator.

For one embodiment, the integration level indicator can be a numeral value that is arbitrarily assigned to each application, and can be adjusted by a user based on the user's personal preference. For another embodiment, the integration level indicator can be a numerical value calculated using a predetermined algorithm based required frequency of user interactions with the application after the application is launched. For example, customer survey data can be used to determine user interaction frequency for a particular application, and the customer survey data can be fed into a trained neutral network to generate a numerical value.

For one embodiment, an application that requires more frequent user actions would be assigned a higher value for its integration level indicator. For example, a calculator would require more frequent user interactions while a video would require less user actions. Therefore, a calculator would be considered more deeply integrated with a control display while a video application would be considered less deeply integrated with a control display. For one embodiment, the more deeply integrated an application is with a control display, the more likely the application is to be launched in a device mode.

For one embodiment, an integration level can be represented by a range of numerical value, and can correspond to a particular control mode. The mapping between integration levels and control modes can be stored in a data store, for example, a control mode configuration table 1304. When receiving a request for launching an application, the multi-display controller 801 can determine an integration level indicator for the application, and find the associated control mode associated with the integration level indicator. The multi-display controller 801 can use the control mode to launch the application.

Figure 14:
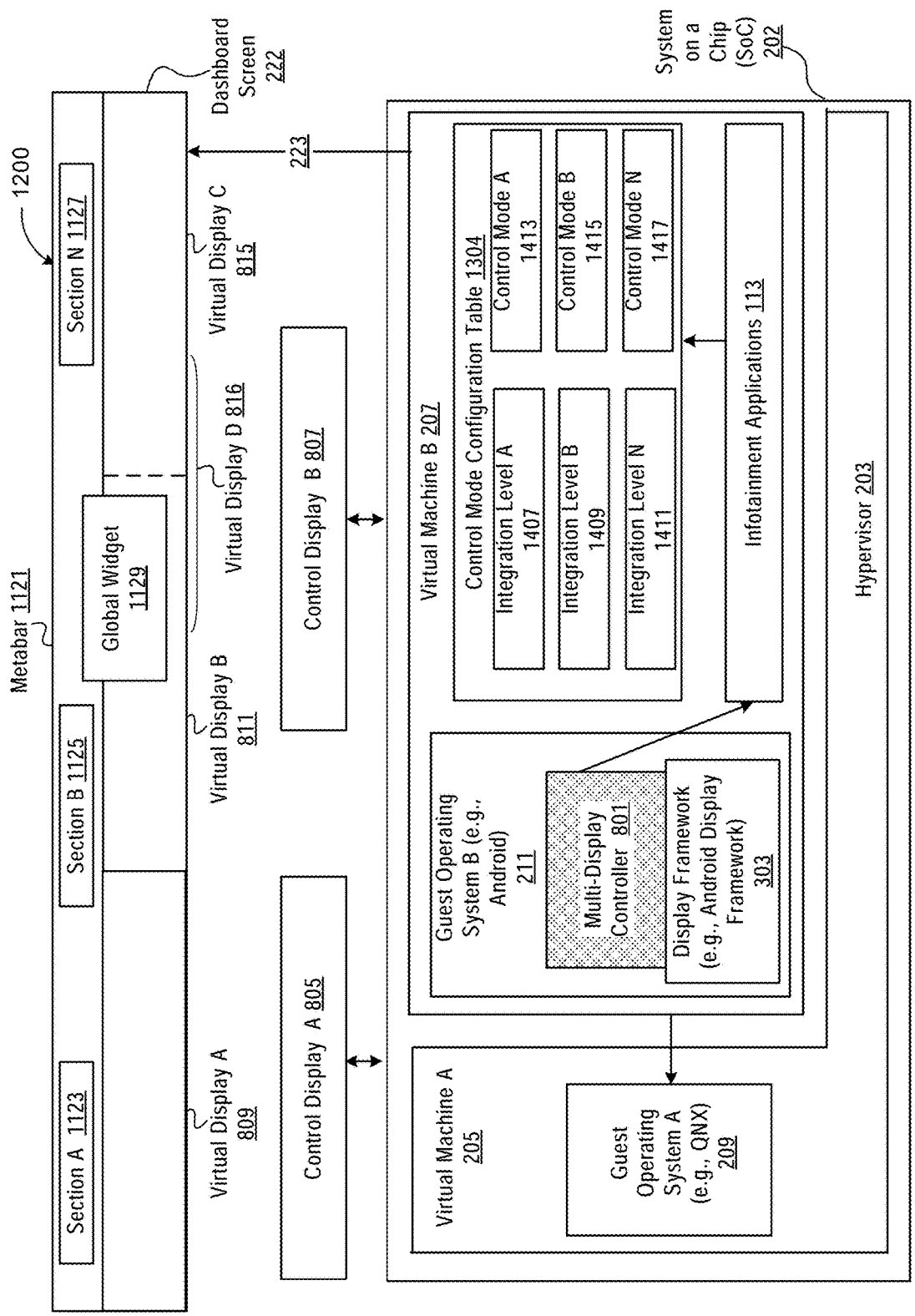
FIG. 14 illustrates an exemplary control mode configuration table in accordance with an embodiment.

FIG. 14 illustrates an exemplary control mode configuration table in accordance with an embodiment.

In FIG. 14, the control mode configuration table 1304 can include a number of entries, each entry including an integration level and a corresponding control mode. For example, the control mode configuration table 1304 includes integration level A 1407, integration level B 1409, and integration level N 1411; and control mode A 1413, control mode B 1415, and control mode N 1417.

For one embodiment, each integration level represents a range of values. The mapping between each value range and a control mode can be predetermined. For one embodiment, the mapping can be adjusted by each user based on the user's preferences.

Figure 15A:
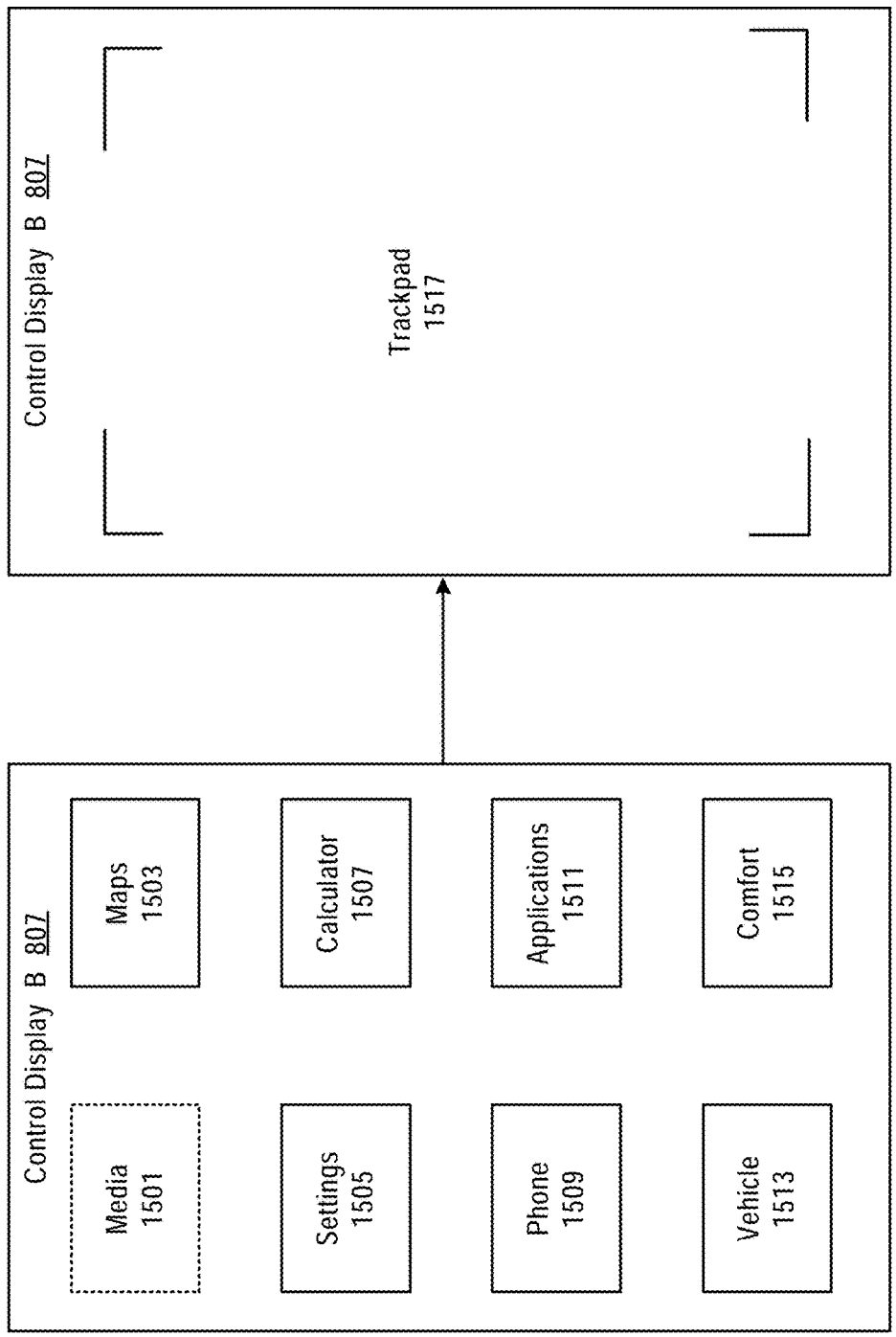
FIGS. 15A-15C illustrate example control modes use to control an application on a dashboard screen in accordance with an embodiment.
Figure 15B:
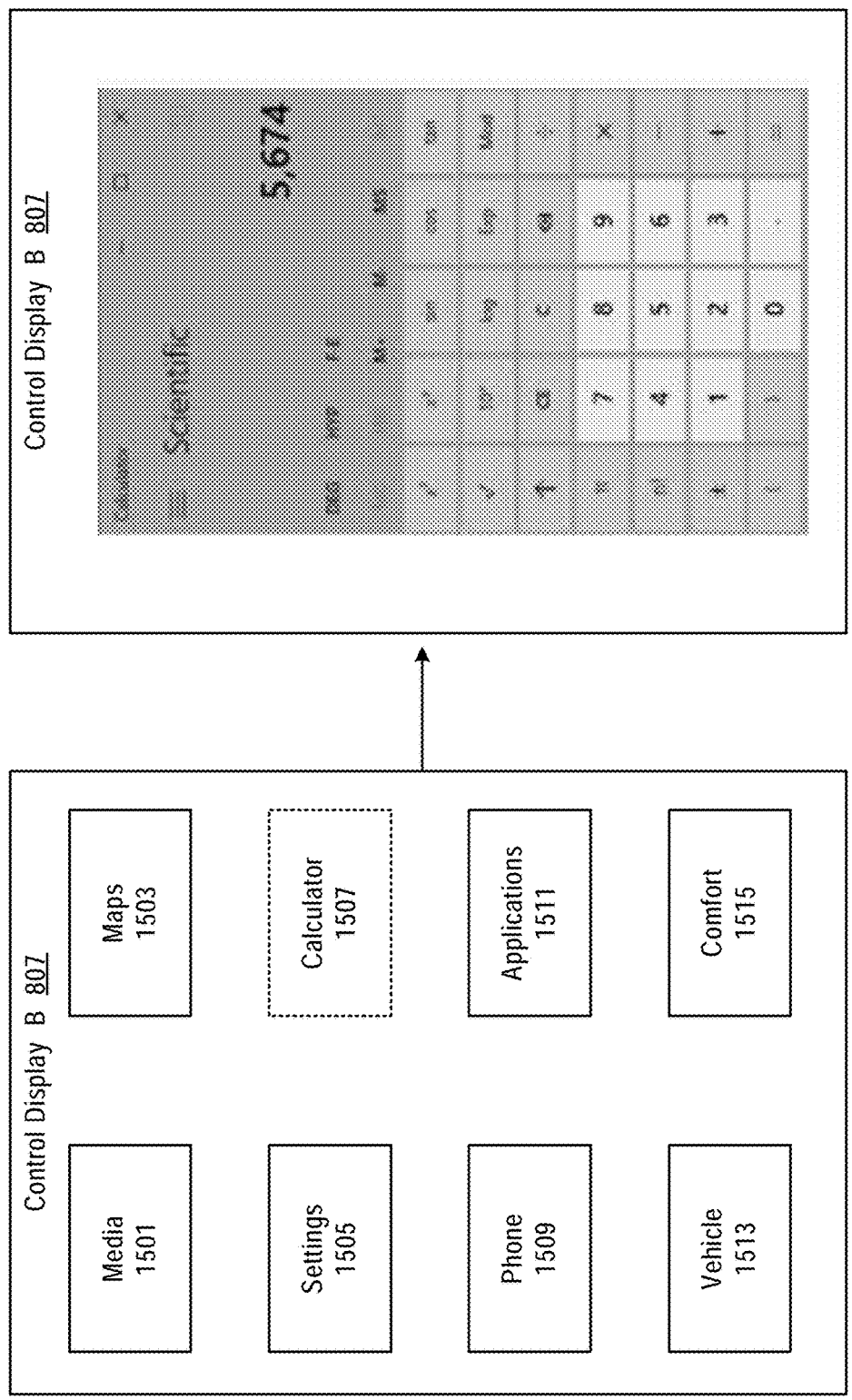
Figure 15C:
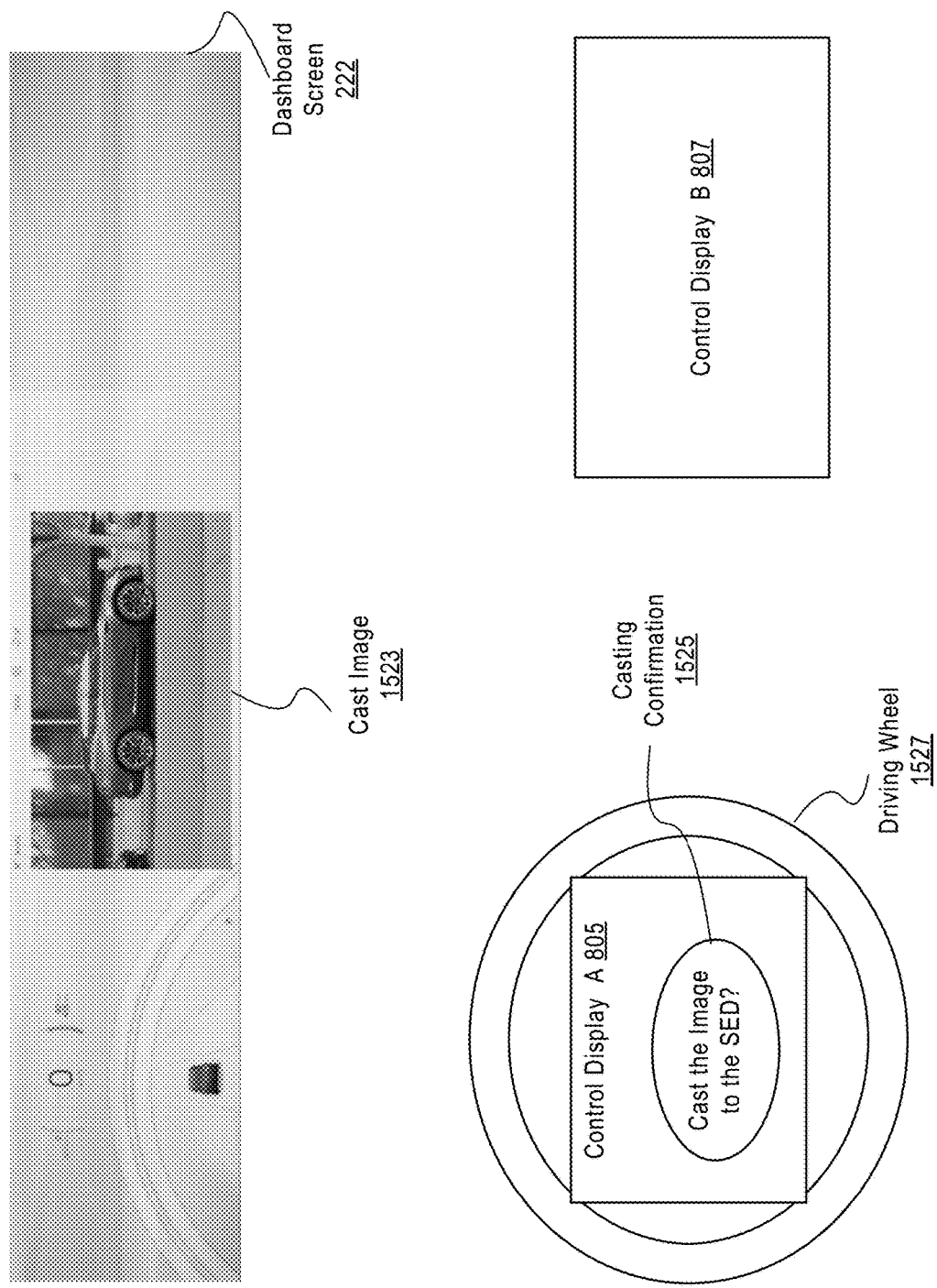

FIGS. 15A-15C illustrate example control modes used to control an application on a dashboard screen in accordance with an embodiment.

These figures use one of control display A 805 and control display B 807 (as shown in FIG. 9 and FIG. 11) to illustrate a particular a control mode. It would be appreciated by a person of ordinary skill in the art that the embodiments described for one control display can be equally applicable to the other control display.

FIG. 15A illustrates control display B 807 in a remote mode, where a media application 1501 of a number of applications 1501 to 1515 is launched from control display B 807 and runs on the dashboard screen 222 (as shown in FIG. 9 and FIG. 11). Once the application is launched, control display B 807 would become a trackpad 1517, which enables a user to control the launched application through a touch-sensitive interface.

FIG. 15B illustrates control display B 807 in a device mode, where a calculator application 1507 is launched from control display B 807. The launched calculator application 1507 can run on control display B 807 with interactions with the dashboard screen 222.

FIG. 15C illustrates control display A 805 within a driving wheel 1527 in a casting mode. When an application is to be launched in a casting mode, a confirmation message 1525 can be displayed to allow a user to accept or reject the application launch request in the casting mode. For one embodiment, when the user accepts the launch request, an image 1523 or a video (not shown) can be cast on the dashboard screen 222. If the user rejects the launch request in the casting mode, the application would be launched in a remote mode or another preconfigured mode.

Figure 16:
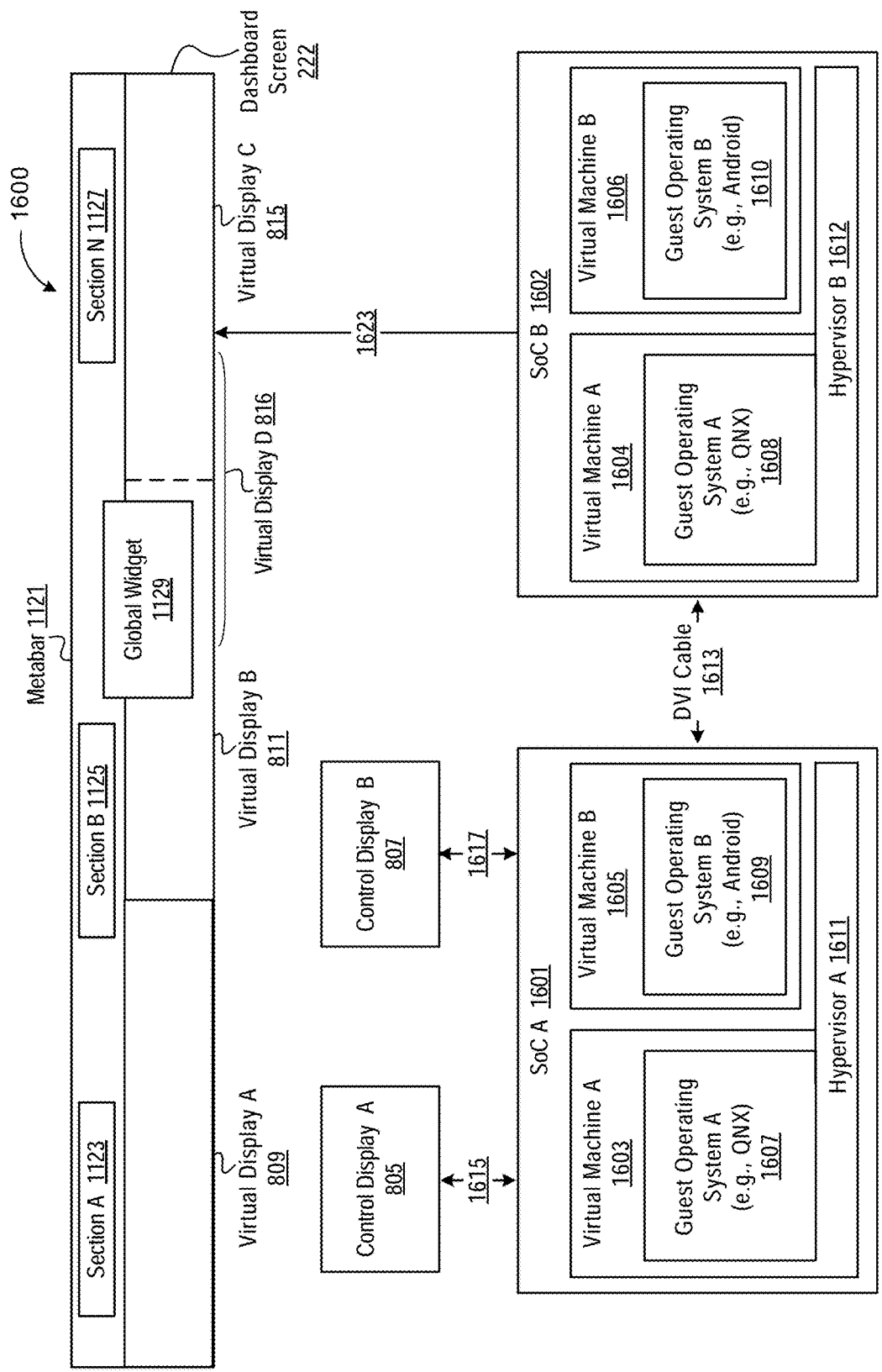
FIG. 16 illustrates an example system 1500 that uses a chipset to increase the computing power of exemplary systems described in this disclosure in accordance with an embodiment.

FIG. 16 illustrates an example system 1600 that uses a chipset to increase the computing power of exemplary systems described in this disclosure in accordance with an embodiment.

As used herein, a chipset is a group of interdependent motherboard chips or integrated circuits that control the flow of data and instructions between a central processing unit (CPU) or microprocessor and external devices. A chipset controls external buses, memory cache and some peripherals. A CPU is unable to function without impeccable chipset timing.

The exemplary systems described above processes graphics and videos, and may require computing power that a single integrated circuit with a cost below a threshold may not be able to satisfy. System 1600 uses one or more additional SoCs connected to SoC A 1601 using a DVI cable 1613 to increase the computing power of SoC A 1601.

As an illustrative example, the chipset in FIG. 16 uses a second SoC 1602. Additional SoCs can be further connected to the second SoC 1602 to further increase the computing power of the exemplary systems described in the disclosure.

For one embodiment, each SoC in system 1600 includes the same software stack. For example, each of SoCs 1601 and 1602 includes a hypervisor 1611 or 1612, a first operating system 1607 or 1608 in a first virtual machine 1603 or 1604 managed by the hypervisor, and a second operating system 1609 or 1610 in a second virtual machine 1505 or 1506 running on top of the first virtual machine 1601 or 1602.

For one embodiment, the first SoC 1601 and the second SoC 1602 can be connected using a DVI cable 1613 or another type of audio/video cable. The first SoC 1601 is connected to control display A 805 and control display B 807, and the second SoC 1602 is connected to the dashboard screen 222. Applications running in the first SoC 1601 can display application menus on control display A 805 and control display B 807. Requests for launching applications from the two control displays 805 and 807 can be routed via the DVI cable 1613 to the second SoC 1602.

Alternatively, the second SoC 1602 is connected to control display A 805 and control display B 807, and the first SoC 1602 is connected to the dashboard screen 222. Applications running in the second SoC 1602 can display application menus on control display A 805 and control display B 807. Requests for launching applications from the two control displays 805 and 807 can be routed via the DVI cable 1613 to the first SoC 1601.

Figure 17:
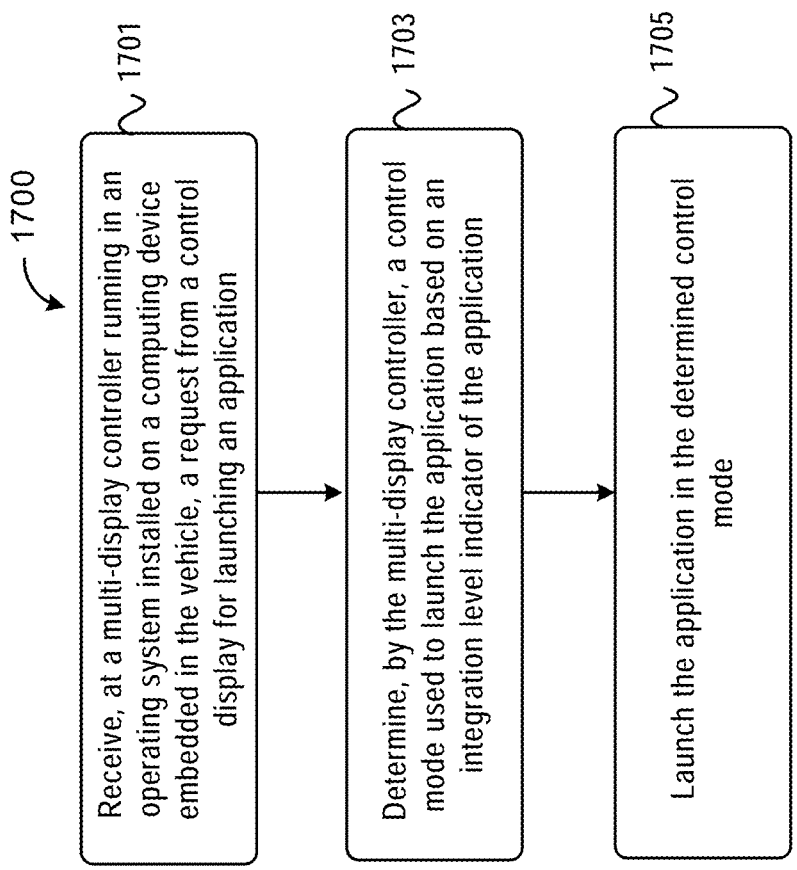
FIG. 17 is a flow diagram of one example method for determining a particular control mode for an application in accordance with an embodiment.

FIG. 17 is a flow diagram of one example method for outputting to a vehicle dashboard screen from a plurality of operating systems. Method 1600 can be performed by hardware (circuitry, dedicated logic, etc.), software (such as is run on a general purpose computer system or a dedicated machine), firmware, or a combination. For example, method 1300 can use the system described in FIG. 9 or FIG. 11.

Referring to flow diagram 1700, in operation 1701, a request is received at a multi-display controller running in an operating system installed on a computing device embedded in the vehicle, a request from a control display for launching an application. The request is sent from at least one of the first control display and the second control display in response to a user selection. The computing device is connected to a coast-to-coast dashboard screen including multiple virtual display areas. The first control display and the second control display are both connected to the computing device through a physical cable, a wireless connection or a Bluetooth connection. The first control display can be positioned within a driving wheel of the vehicle and include an application menu. The second control display is positioned between the driver seat and a front passenger seat. The first control display can include an application menu which is a subset of an application menu on the second control display.

In operation 1703, in response to receiving the request, the multi-display controller determines a control mode used to launch the application based on an integration level indicator of the application. The integration level indicator can be a numerical value calculated by the multi-display controller based on features of the application and expected frequency of user interactions with the application after the application is launched.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in various ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable one to make or use the methods, systems, and apparatus of the present disclosure. Various modifications to these embodiments will be readily apparent, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for selecting control modes for launching applications in a vehicle with a dashboard screen, the system comprising:
    a computing device embedded in the vehicle, the computing device connected to the dashboard screen and a control display; and
    an operating system installed on the computing device, the operating system running a multi-display controller and one or more applications;
    wherein the multi-display controller is to
        receive a request from the control display for launching an application,
        determine a control mode used to launch the application based on an integration level indicator of the application, the integration level indicator indicating a pattern of user interactions to operate the application after the application is launched, and
        launch the application in the determined control mode.

2. The system of claim 1, wherein the computing device is a single integrated circuit, a device including a plurality of chips integrated onto a motherboard, or a device including a plurality of integrated circuits.

3. The system of claim 1, wherein the control mode is one of a device mode, a casting mode, and a remote mode.

4. The system of claim 1, wherein the integration level indicator is a numerical value calculated based on the pattern of user interactions with the application after the application is launched.

5. The system of claim 1, wherein the control display is one of a first control display and a second control display, wherein the first control display is positioned within a steering wheel of the vehicle, and wherein the second control display is positioned between a driver seat and a front passenger seat in the vehicle.

6. The system of claim 1, wherein the dashboard screen is to display a background color that matches an interior color scheme of the vehicle.

7. The system of claim 1, wherein the dashboard screen includes a metabar that is persistently visible across the dashboard screen for information display.

8. The system of claim 7, wherein the dashboard screen further includes a global widget that is contextually created in response to a state change of a system component in the vehicle.

9. The system of claim 7, wherein the metabar is to display at least one of environmental information, driving-related information, and a notification of a state change of a system component in the vehicle.

10. The system of claim 8, wherein the system component change that causes the global widget to be generated is one of an incoming call, a volume adjustment of a media player, a Wi-Fi turn-off, an interior temperature change of the vehicle, and a Bluetooth state change.

11. The system of claim 8, wherein the global widget is to disappear after a session associated with the state change of the system component is completed.

12. The system of claim 8, wherein a foreground service in the operating system is to monitor a plurality of system components for a state change and to create the global widget in response to the state change.

13. The system of claim 12 wherein the foreground service includes a first user interface component for creating the metabar, and a second user interface component for creating the global widget.

14. A method for selecting control modes for launching applications in a vehicle with a dashboard screen, the system comprising:
receiving, at a multi-display controller running in an operating system installed on a computing device embedded in the vehicle, a request from a control display for launching an application;
determining, by the multi-display controller, a control mode used to launch the application based on an integration level indicator of the application the integration level indicator indicating a pattern of user interactions to operate the application after the application is launched; and
launching the application in the determined control mode.

15. The method of claim 14, wherein the computing device is a single integrated circuit, a device including a plurality of chips integrated onto a motherboard, or a device including a plurality of integrated circuits.

16. The method of claim 14, wherein the control mode is one of a device mode, a casting mode, and a remote mode.

17. The method of claim 14, wherein the integration level indicator is a numerical value calculated based on the pattern of user interactions with the application after the application is launched.

18. The method of claim 14, wherein the control display is one of a first control display and a second control display, wherein the first control display is positioned within a steering wheel of the vehicle, and wherein the second control display is positioned between a driver seat and a front passenger seat in the vehicle.

19. The method of claim 14, wherein the dashboard screen is to display a background color that matches an interior color scheme of the vehicle.

20. The method of claim 14, wherein the dashboard screen includes a metabar that is persistently visible across the dashboard screen for information display.

21. The method of claim 20, wherein the dashboard screen further includes a global widget that is contextually created in response to a state change of a system component in the vehicle.

22. The method of claim 20, wherein the metabar is to display at least one of environmental information, driving-related information, and a notification of a state change of a system component in the vehicle.

23. The method of claim 21, wherein the system component change that causes the global widget to be generated is one of an incoming call, a volume adjustment of a media player, a Wi-Fi turn-off, an interior temperature change of the vehicle, and a Bluetooth state change.

24. The method of claim 21, wherein the global widget is to disappear after a session associated with the state change of the system component is completed.

25. The method of claim 21, wherein a foreground service in the operating system is to monitor a plurality of system components for a state change and to create the global widget in response to the state change.

26. The system of claim 25, wherein the foreground service includes a first user interface component for creating the metabar, and a second user interface component for creating the global widget.

27. A non-transitory machine-readable medium having instructions stored therein, which when executed by a processor, cause the processor to perform operations for launching applications in a vehicle with a dashboard screen, the operations comprising:
receiving, at a multi-display controller running in an operating system installed on a computing device embedded in the vehicle, a request from a control display for launching an application;
determining, by the multi-display controller, a control mode used to launch the application based on an integration level indicator of the application the integration level indicator indicating a pattern of user interactions to operate the application after the application is launched; and
launching the application in the determined control mode.

* * * * *